(12) United States Patent
Tsumagari et al.

(10) Patent No.: US 7,369,477 B2
(45) Date of Patent: May 6, 2008

(54) INFORMATION RECORDING MEDIUM, INFORMATION RECORDING APPARATUS, AND INFORMATION REPRODUCING APPARATUS

(75) Inventors: Yasufumi Tsumagari, Yokohama (JP); Hideki Mimura, Yokohama (JP); Shinichi Kikuchi, Kawasaki (JP); Kazuhiko Taira, Yokohama (JP); Hideki Takahashi, Kashiwa (JP); Tadashi Kobayashi, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 387 days.

(21) Appl. No.: 10/352,285

(22) Filed: Jan. 28, 2003

(65) Prior Publication Data

US 2003/0142609 A1 Jul. 31, 2003

(30) Foreign Application Priority Data

Jan. 31, 2002 (JP) ............................. 2002-024789

(51) Int. Cl.
*G11B 5/09* (2006.01)
(52) U.S. Cl. ................................. 369/59.25
(58) Field of Classification Search ............ 369/30.04, 369/30.08, 30.09, 47.13, 47.16, 47.54, 53.22, 369/59.26, 59.25
See application file for complete search history.

(56) References Cited

U.S. PATENT DOCUMENTS

2002/0039480 A1* 4/2002 Ando et al. .................... 386/68
2004/0223742 A1* 11/2004 Ando et al. .................... 386/95
2005/0025459 A1* 2/2005 Kato et al. ..................... 386/95
2005/0031305 A1* 2/2005 Kim et al. ...................... 386/69
2005/0100328 A1* 5/2005 Kikuchi et al. ................ 386/95

FOREIGN PATENT DOCUMENTS

| JP | 2000-137948 | 5/2000 |
| JP | 2000-195231 A | 7/2000 |
| JP | 2001-143448 | 5/2001 |
| WO | WO 00/46803 | 8/2000 |

OTHER PUBLICATIONS

U.S. Appl. No. 10/284,493, filed Oct. 31, 2002, Tsumagari et al.

* cited by examiner

*Primary Examiner*—Wayne Young
*Assistant Examiner*—Lixi Chow
(74) *Attorney, Agent, or Firm*—Pillsbury Winthrop Shaw Pittman, LLP

(57) ABSTRACT

A information recording medium on which stream information including images or sound and management information of the stream information are digitally recorded includes a first recording region in which first management information of the management information for use in common in management of each stream information divided every predetermined data amount can be recorded, and a second recording region in which a reference unit of information obtained by adding second management information of the management information for use in management of divided individual stream information to the divided stream information can be recorded.

3 Claims, 44 Drawing Sheets

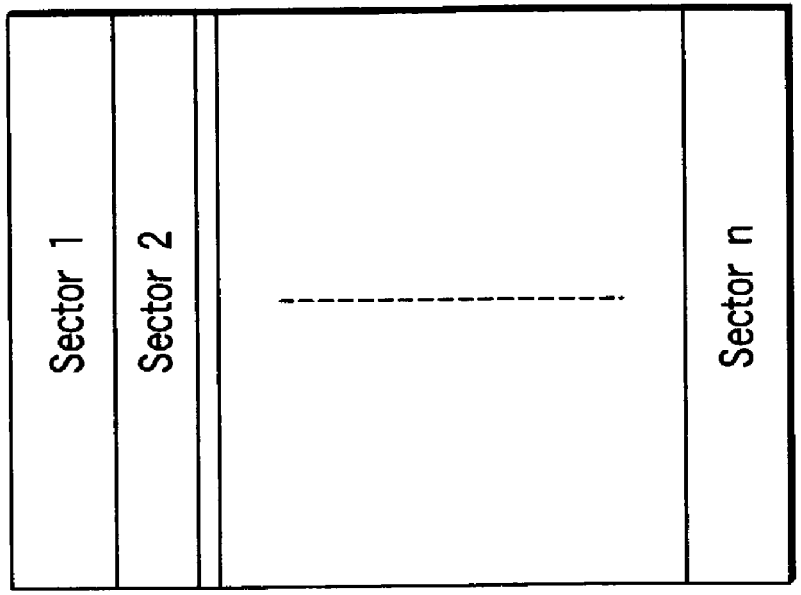
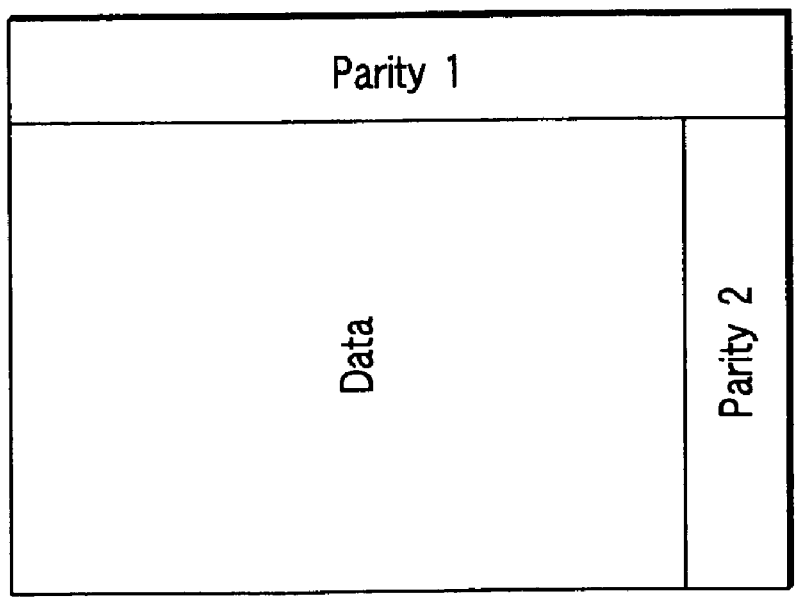
FIG. 16

Difference of process method by data

| Layer | |
|---|---|
| Application (RTR) | Form management data and an AV object in different files. The files are arranged in different ECC blocks |
| File system (UDF, and the like) | The file of an AV object, to which an AV attribute such as file type has been added, is managed. The file to which an attribute has been added is prohibited from being rearranged or processed. It is possible to perform defect management (rearrangement) with respect to a normal file to which an AV attribute has not been added |
| Command (MMC2/3, and the like) | Commands for AV and PC (General Data) are defined separately. Since speed is given priority in AV separation, the number of error corrections is reduced. Even when error correction is impossible, a processing error is not generated, and operation is continued according to the specifications |
| Drive | The drive has a specification such that processing suitable for AV commands is performed. A secondary switch process is prohibited. Moreover, depending on the capability of the drive, since processing is delayed, verification is not performed in many cases. With an error cannot be corrected during reproduction, the portion which can be corrected is returned. Since the drive operates for PC data with emphasis on reliability, for example, it is also possible to always execute a verify process |
| Disk | It is possible to add sector attributes in accordance with commands (e.g., DVD-RAM). For example, an AV attribute is added to a sector recorded by an AV command, and a secondary switch process such as READ RE-ASSIGN is prohibited |

FIG. 17

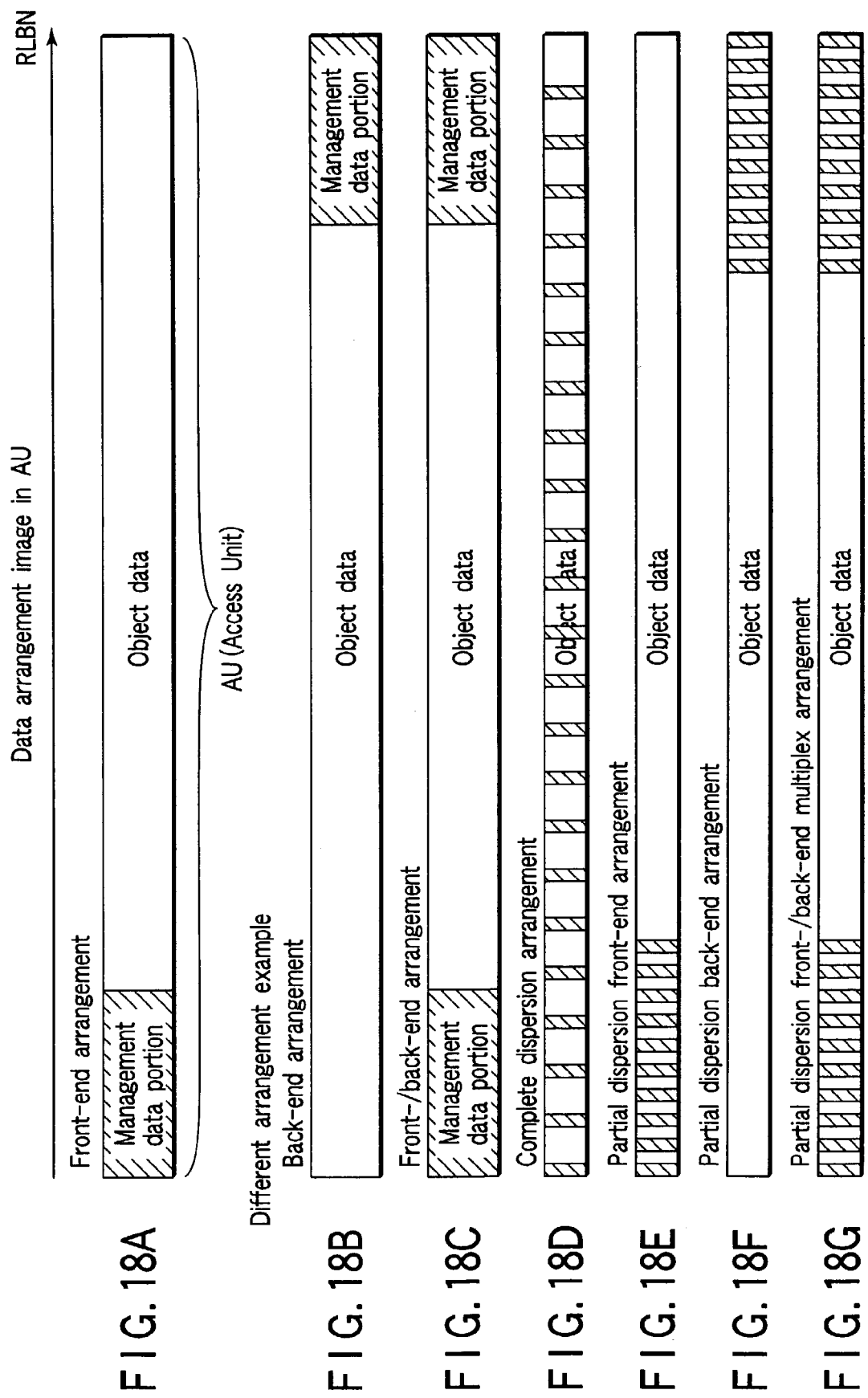

Data encoding example of management data portion

Complete dispersion arrangement example

· The management data portions (management data including the parity) are dispersed in the AU in byte units

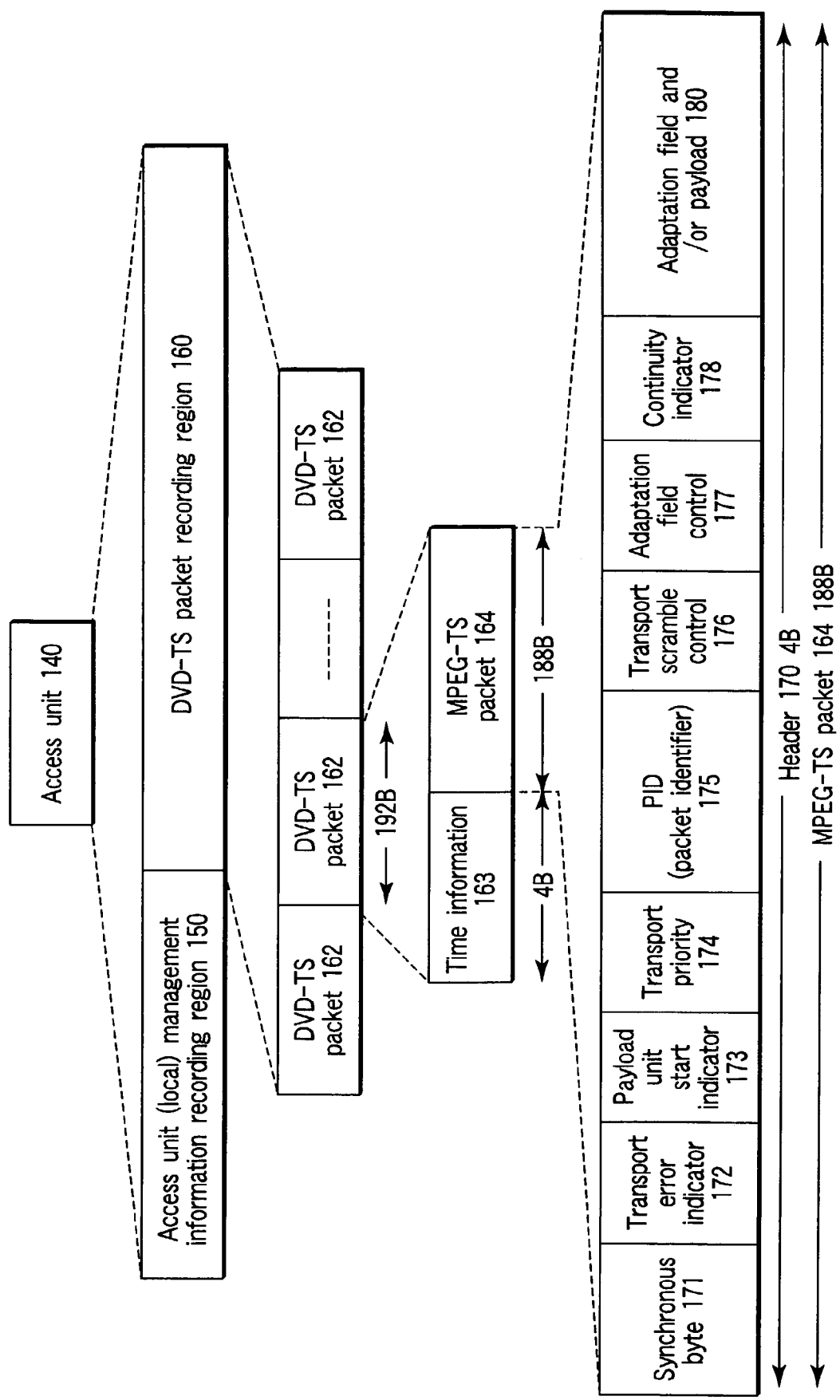
F I G. 29

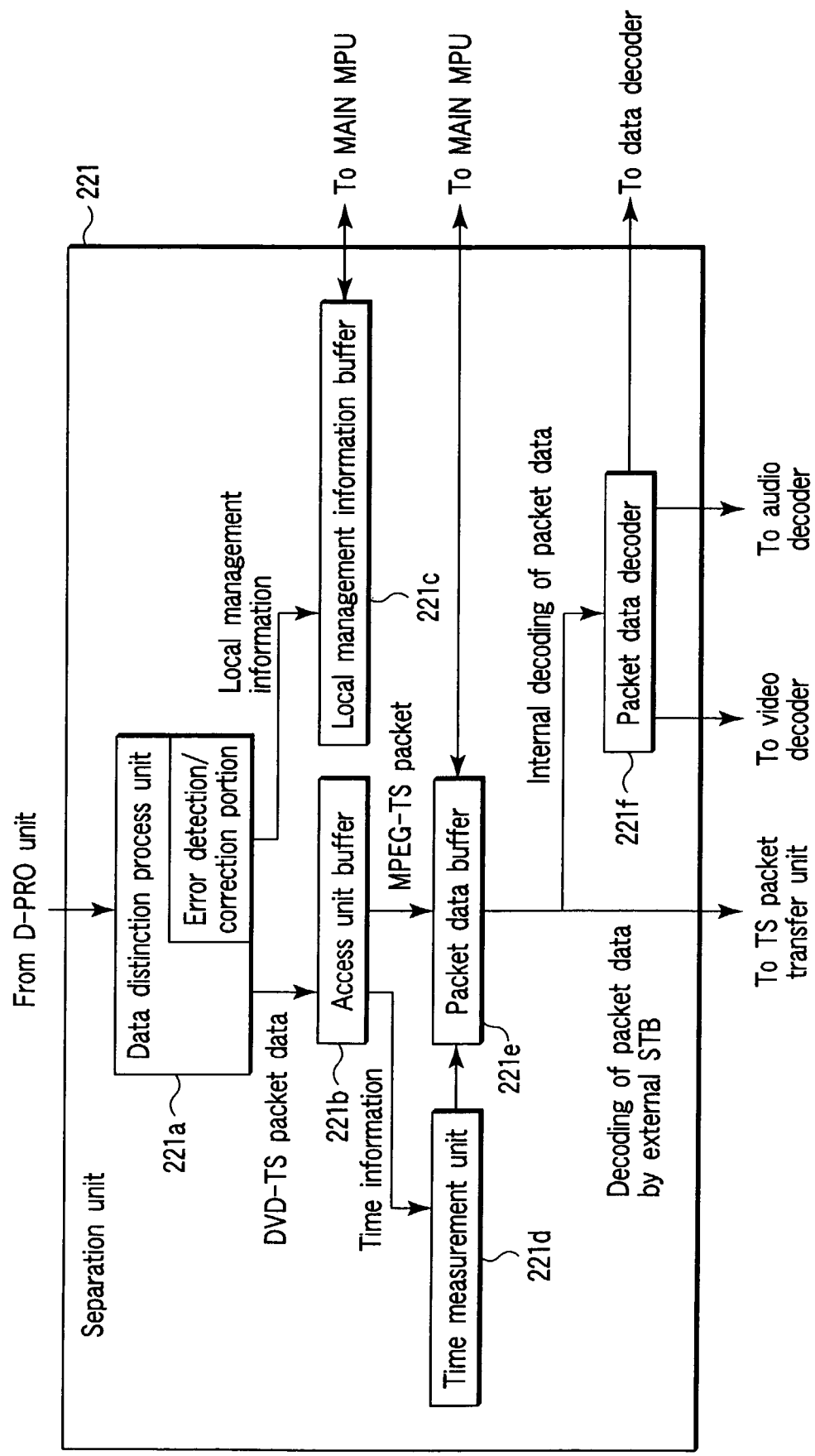
F I G. 37

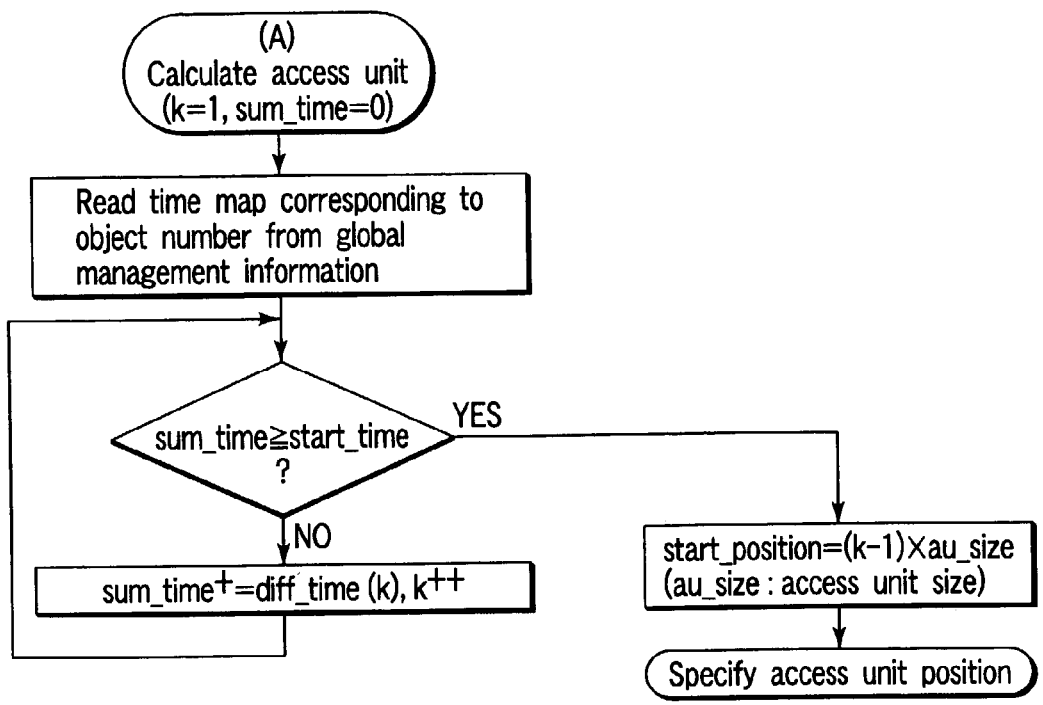
F I G. 39A
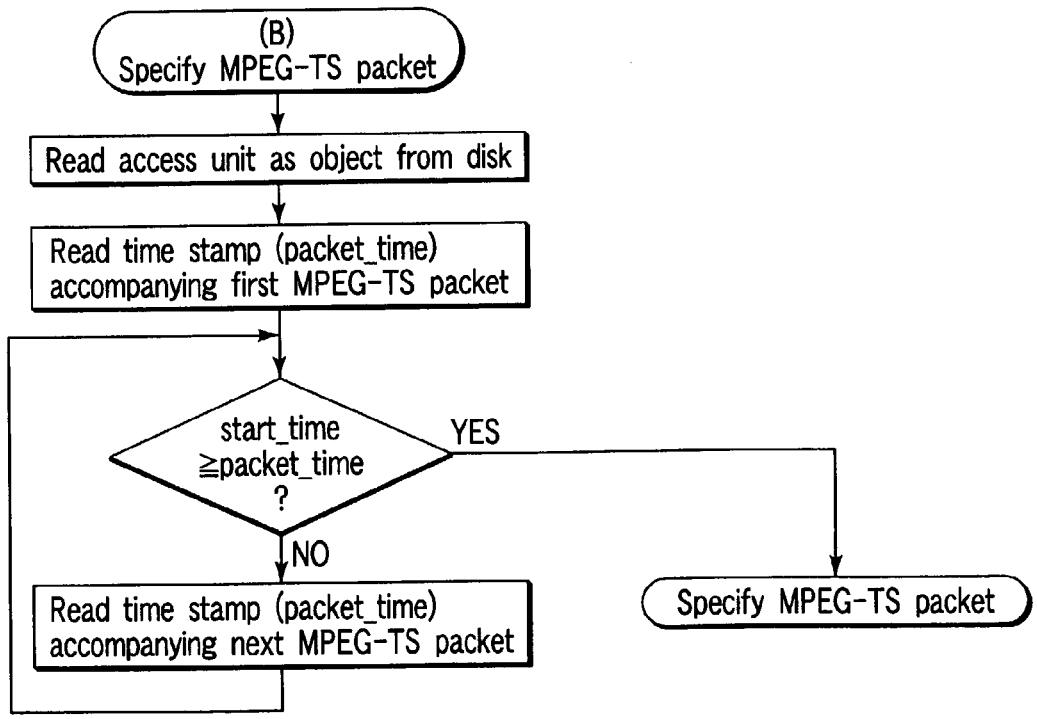
F I G. 39B

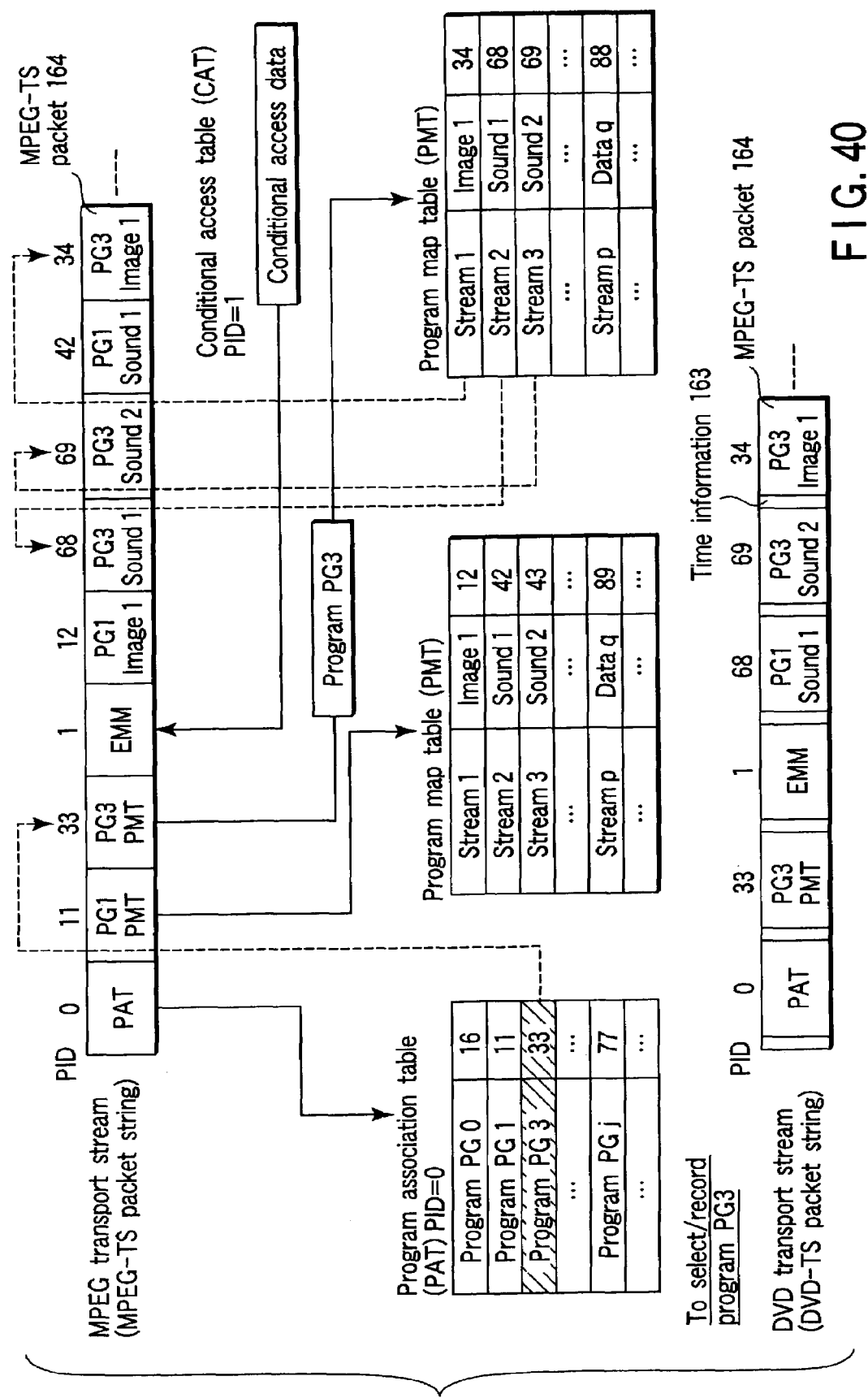
F I G. 40

INFORMATION RECORDING MEDIUM, INFORMATION RECORDING APPARATUS, AND INFORMATION REPRODUCING APPARATUS

CROSS-REFERENCE TO RELATED APPLICATIONS

This application is based upon and claims the benefit of priority from the prior Japanese Patent Application No. 2002-024789, filed Jan. 31, 2002, the entire contents of which are incorporated herein by reference.

BACKGROUND OF THE INVENTION

1. Field of the Invention

The present invention relates to an information recording medium, such as an optical disk, on which digital data is recorded with high density. Moreover, the present invention relates to an information recording apparatus which records digital data on such an information recording medium with high density. Furthermore, the present invention relates to an information reproducing apparatus which reproduces digital data recorded with high density on such an information recording medium.

2. Description of the Related Art

As is well known, in recent years, television (TV) broadcasting has shifted to the use of digital transmission, and there has accordingly been a demand for streamer equipment to record digital TV broadcasts.

Presently, as the data transfer form at of digital TV broadcast in Japan, the U.S., and Europe, the MPEG-transport stream (TS) defined mainly according to the moving picture image coding experts group (MPEG) standard is being used.

It is believed that an MPEG-TS system will be standardized in the field of digital broadcasting using moving images in future. Currently, as an apparatus which records digital broadcast data sent using MPEG-TS, the digital (D)-video home system (VHS), in which a tape is used as the recording medium, is being marketed. However, for convenience, there has been a demand for an apparatus in which an optical disk is used as the recording medium.

In general, digital TV broadcasts are received/reproduced by a set-top box (STB). The STB is an apparatus which subjects encrypted data to extension/reproduction processing based on a key distributed by a broadcast station.

When the received data is reproduced as such, a digital extension portion decrypts the data, an MPEG decoder portion decodes the data, and a video encoder portion converts the data to a TV signal and displays the data as a picture on a TV screen.

On the other hand, a method of storing the data comprises: transferring the digital data received from a tuner system as a bit stream to a recording apparatus via a digital interface such as the Institute of Electrical and Electronics Engineers (IEEE) 1394 Interface (I/F) without changing the state of the data; and recording the data on a recording medium.

Conversely, to reproduce the data recorded on the recording medium from the beginning or from midway, all the data is sent as such, and reproduced on the STB side. As content to be recorded, a plurality of programs are multiplexed and recorded in some cases. In the case, the desired program is selected and reproduced on the STB side.

As a recording apparatus now on sale, there is D-VHS in which tape media are used as the recording media. The tape media have a disadvantage that there is not random accessibility, and a problem is that a scene actually desired to be seen cannot momentarily be reproduced. Therefore, there has been an increasing demand for realization of the recording apparatus which uses high-capacity optical disk media such as Digital Versatile Disc (DVD)-Random Access Memory (RAM).

From the DVD forum, as of February, 2001, as a standard in which video information can be recorded or reproduced with respect to the information recording medium, "DVD Specifications for DVD-RAM/DVD-RW/DVD-R for General Discs Part 5: STREAM RECORDING" has been prepared.

Additionally, in this standard, to match concept with that of another DVD standard, a pseudo MPEG-Program Stream (PS) packet is constituted by one unit of 2 kilobytes (KB). Therefore, header information and access time information are added in a 2 KB unit, and as a result recording efficiency is lowered.

On the other hand, in the standard, access information is prepared as concentration information in order to effectively utilize the random accessibility of the optical disk. Additionally, the access information is basically prepared with respect to a certain given data amount to be recorded, or a data amount to be recorded by a given reproduction time unit. Therefore, when a recording capacity of the optical disk increases, an information amount also increases. This results in an increase of the capacity of a memory for storing information which has to be constantly held by the recording apparatus.

BRIEF SUMMARY OF THE INVENTION

The present invention has been developed in consideration of the above-described situation, and an object is to provide an information recording medium, information recording apparatus, and information reproducing apparatus which effectively promote high-density recording of digital data and which save information needed to be constantly held in the apparatus and which enhance efficiency of a memory capacity.

According to one aspect of the present invention, there is provided an information recording medium in which stream information including images or sound and management information of the stream information are digitally recorded, the medium comprising:

a first recording region in which first management information of the management information for use in common in management of each stream information can be recorded, with the first management information being divided under a predetermined condition; and a second recording region in which a reference unit of information obtained by adding second management information of the management information for use in management of divided individual stream information to the divided stream information can be recorded.

According to one aspect of the present invention, there is provided an information recording apparatus which digitally records stream information including images or sound and management information of the stream information in an information recording medium, the stream information being divided every predetermined data amount unit, the management information being divided into first management information for use in common in management of each divided stream information and second management information for use in management of divided individual stream information, the apparatus comprising:

a first recording portion which records the first management information in the information recording medium; and a second recording portion which adds the corresponding second management information to the divided stream information to form a reference information unit and which records the reference information unit in the information recording medium.

According to one aspect of the present invention, there is provided an information reproducing apparatus comprising:

a readout portion to read information from an information recording medium in which stream information including images or sound is divided every predetermined data amount unit and in which management information of the stream information is divided into first management information for use in common in management of each divided stream information and second management information for use in management of divided individual stream information and in which first management information and reference information unit obtained by adding the corresponding second management information to the divided stream information are recorded; and a control portion which separates the second management information included in the reference information unit read out of the readout portion and the stream information.

BRIEF DESCRIPTION OF THE SEVERAL VIEWS OF THE DRAWING

FIG. 16 is an explanatory view of an ECC block;

FIG. 17 is an explanatory view of a difference of a process method by a layer;

FIGS. 18A to 18G are explanatory views of arrangement of management data in the access unit;

FIG. 29 is an explanatory view of information stored in a DVD-TS packet recording region;

FIG. 37 is a block diagram showing details of a separation unit;

FIGS. 39A and 39B are flowcharts showing details of the usual reproduction operation;

FIG. 40 is an explanatory view of acquisition of PID;

DETAILED DESCRIPTION OF THE INVENTION

One embodiment of the present invention will be described hereinafter in detail with reference to the drawings. FIGS. 1A to 1H show data structures stored in an information recording medium 100 for use in a recording/reproducing system described in the embodiment.

Figure 1A:
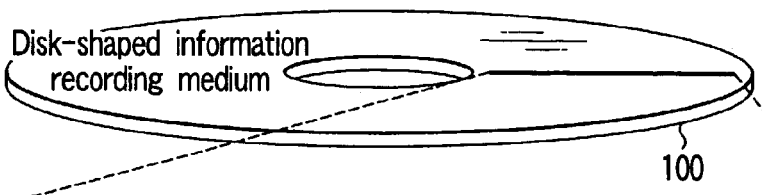
FIGS. 1A to 1H are diagrams showing a hierarchical structure of data stored in an information recording medium.
Figure 1B:
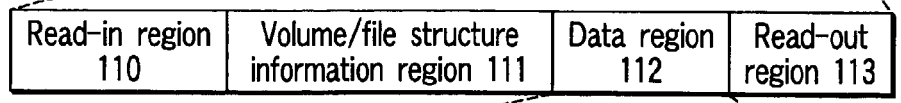

In FIGS. 1A, 1B, the information recording medium 100 is roughly divided into a read-in region 110, volume/file structure information region 111, data region 112, and read-out region 113 from the disk inner side.

Figure 1C:
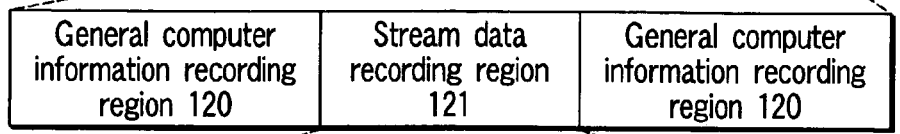

As shown in FIG. 1C, the data region 112 is roughly divided into a general computer information recording region 120, and a stream data recording region 121.

Figure 1D:
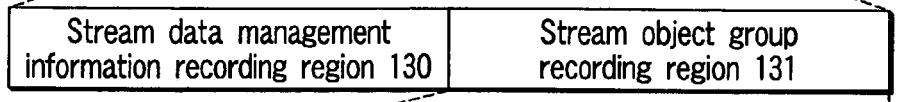

As shown in FIG. 1D, the stream data recording region 121 is constituted of a stream object group recording region 131 as recording/reproducing data, and a stream data management information recording region 130 which manages the data.

Figure 1E:
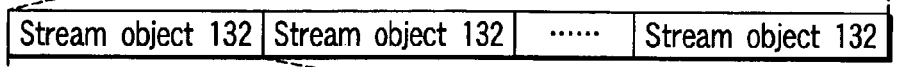

As shown in FIG. 1E, the stream object group recording region 131 includes one or more stream objects (SOB) 132 constituted of one continuous stream data.

Figure 1F:
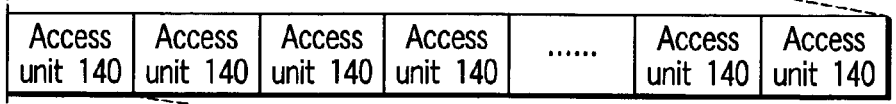
Figure 2:
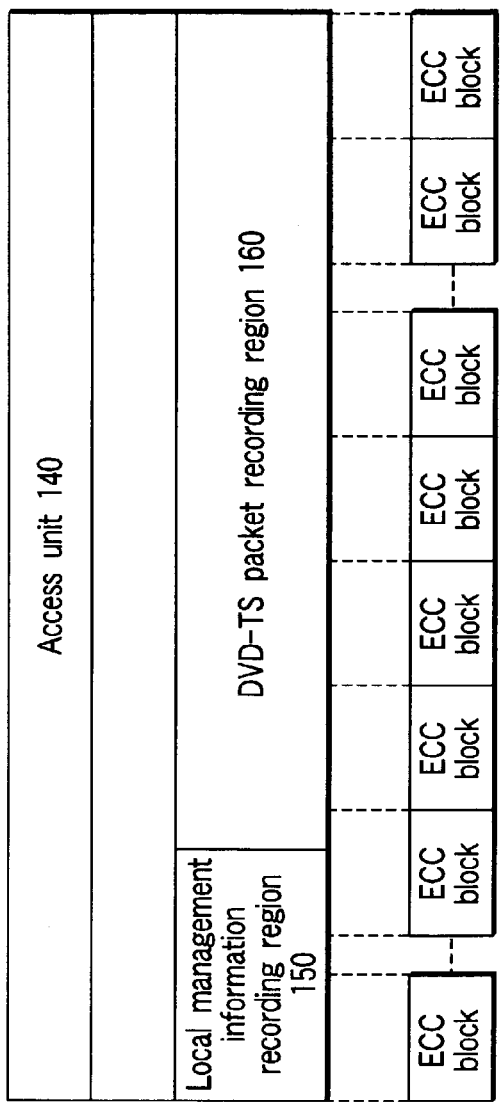
FIG. 2 is an explanatory view of a structure of an access unit.

As shown in FIG. 1F, the stream object 132 includes one or more access units (AU) 140 as a reference information unit. As shown in FIG. 2, the access unit 140 is assumed to have an integer multiple fixed length of an ECC size. In this embodiment, it is assumed that the ECC size is 64 KB, the number of ECC is 32, and 32×64 KB=2 megabytes (MB).

The ECC is an error-correction code, and is a redundant code (parity) added separately from the original data in order to correct errors such as a garbled bit. Since the parity is added, it is possible to detect and correct the error generated in the data. The ECC is also used in a data recording format into the information recording medium 100. A data unit added to the ECC is an ECC block.

Figure 1G:
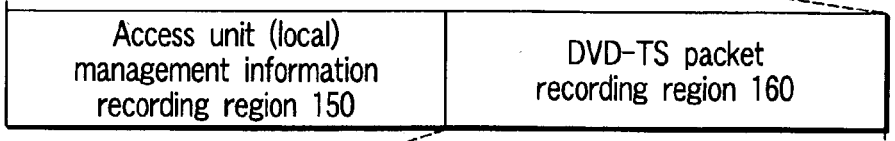

Furthermore, as shown in FIG. 1G, the access unit 140 is constituted of a DVD-TS packet recording region 160 and an access unit management information recording region 150 which manages the unit.

Figure 1H:
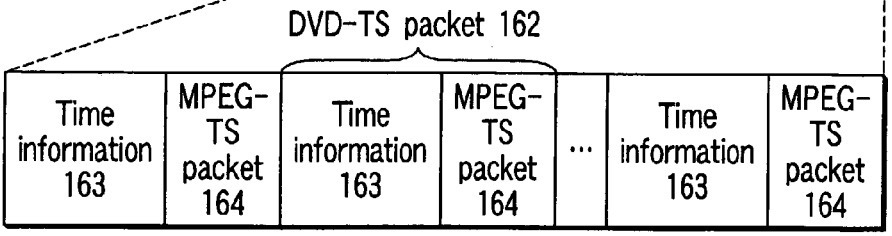

As shown in FIG. 1H, the DVD-TS packet recording region 160 is constituted of one or more data packets 164 (MPEG-TS packet in the embodiment), and time information 163 added to each data packet 164.

Figure 3:
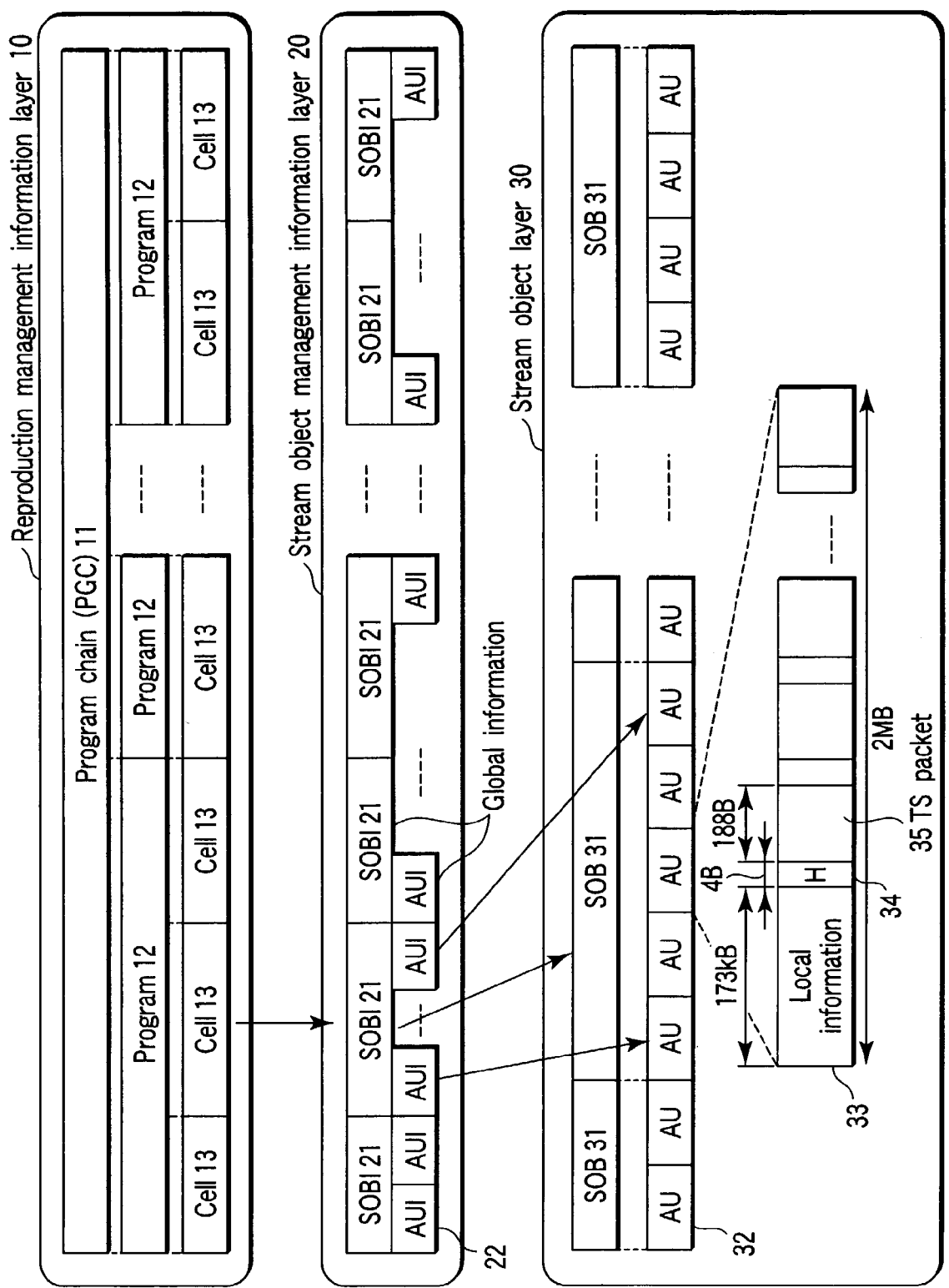
FIG. 3 is an explanatory view of a contents model of recording/reproducing.

FIG. 3 shows a contents model of recording/reproducing in the recording/reproducing system described in the embodiment. As shown in FIG. 3, the model has a structure including a reproduction management information layer 10 which defines a reproduction order, a stream object management information layer 20 which manages reproduction data, and a stream object layer 30 of the reproduction data.

In FIG. 3, a program chain (PGC) 11 which defines a reproduction sequence is disposed in the reproduction management information layer 10, and includes one or more programs 12.

Moreover, the program 12 is constituted of one or more cells 13. Furthermore, in FIG. 3, one or more pieces of stream object information (SOBI) 21 which manages the reproduction data is disposed in the stream object management information layer 20, and includes one or more pieces of access unit management information (AUI) 22 which manages each access unit 32 [the same as the access unit 140 of FIG. 1F].

Furthermore, in FIG. 3, a stream object (SOB) 31 as the reproduction data [the same as the stream object 132 of FIG. 1E] is disposed in the stream object layer 30, and includes one or more access units 32 as a basic unit of access.

The access unit 32 is constituted of local information 33 [the same as the access unit management information recording region 150 of FIG. 1G], a header H 34 of time information [the same as the time information 163 of FIG. 1H], and a MPEG-TS packet 35 as effective data [the same as each MPEG-TS packet 164 of FIG. 1H].

A reproduction instruction is given by designating the start AUI 22 and end AUI 22 in the stream object management information layer 20 by the number of the SOBI 21 shown by the cell 13 in the reproduction management information layer 10.

Thereby, the reproduction is started from the corresponding start AU 32 in the SOB 31 of the stream object layer 30, and stopped at the end AU 32. In the reproduction over a plurality of SOBs 31, without stopping the reproduction at the end AU 32, the reproduction from the start AU 32 of the next SOB 31 is continued so that continuous reproduction is possible.

Figure 4:
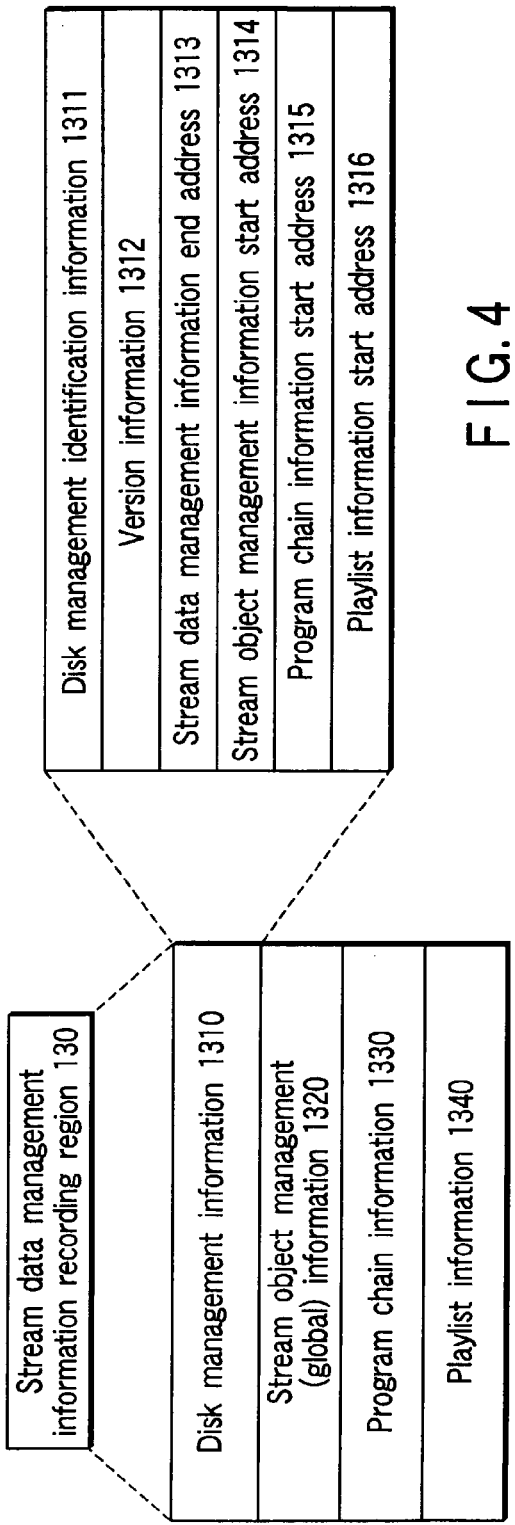
FIG. 4 is an explanatory view of details of disk management information.

FIG. 4 shows content of the stream data management information recording region 130. The stream data management information recording region 130 includes a disk management information 1310, stream object management information (global information) 1320, program chain information 1330, and playlist information 1340 which can be selected and defined by the user.

As shown in FIG. 4, the disk management information 1310 includes: disk management identification information 1311 for use in judging whether or not the disk conforms to the data structure of the present invention; version information 1312 which indicates a revision number of the data structure of the present invention; a stream data management information end address 1313 which indicates an end position of the stream data management information recording region 130; a stream object management information start address 1314 which indicates a start position of each information; a program chain information start address 1315; and a playlist information start address 1316.

Figure 5:
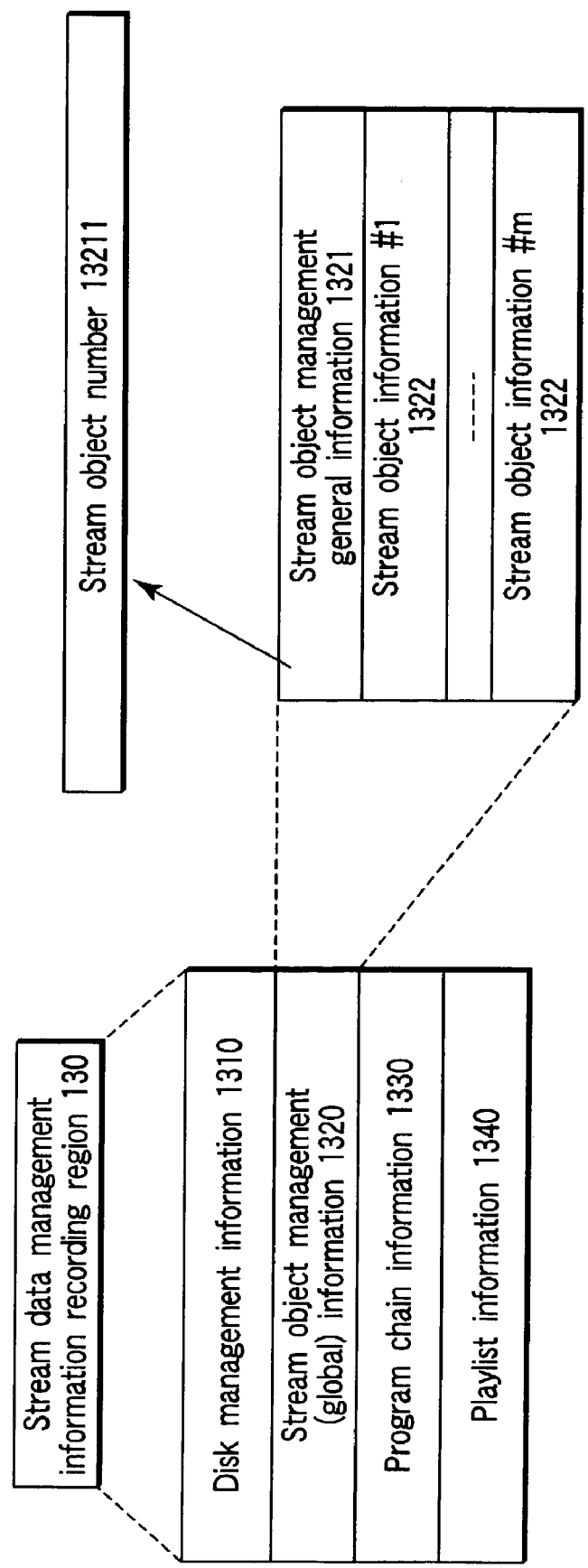
FIG. 5 is an explanatory view of details of stream object management information.

FIG. 5 shows content of the stream object management information 1320. The stream object management information 1320 is constituted of stream object management general information 1321 and one or more pieces of stream object information 1322. The stream object management general information 1321 includes a stream object number 13211.

Figure 6:
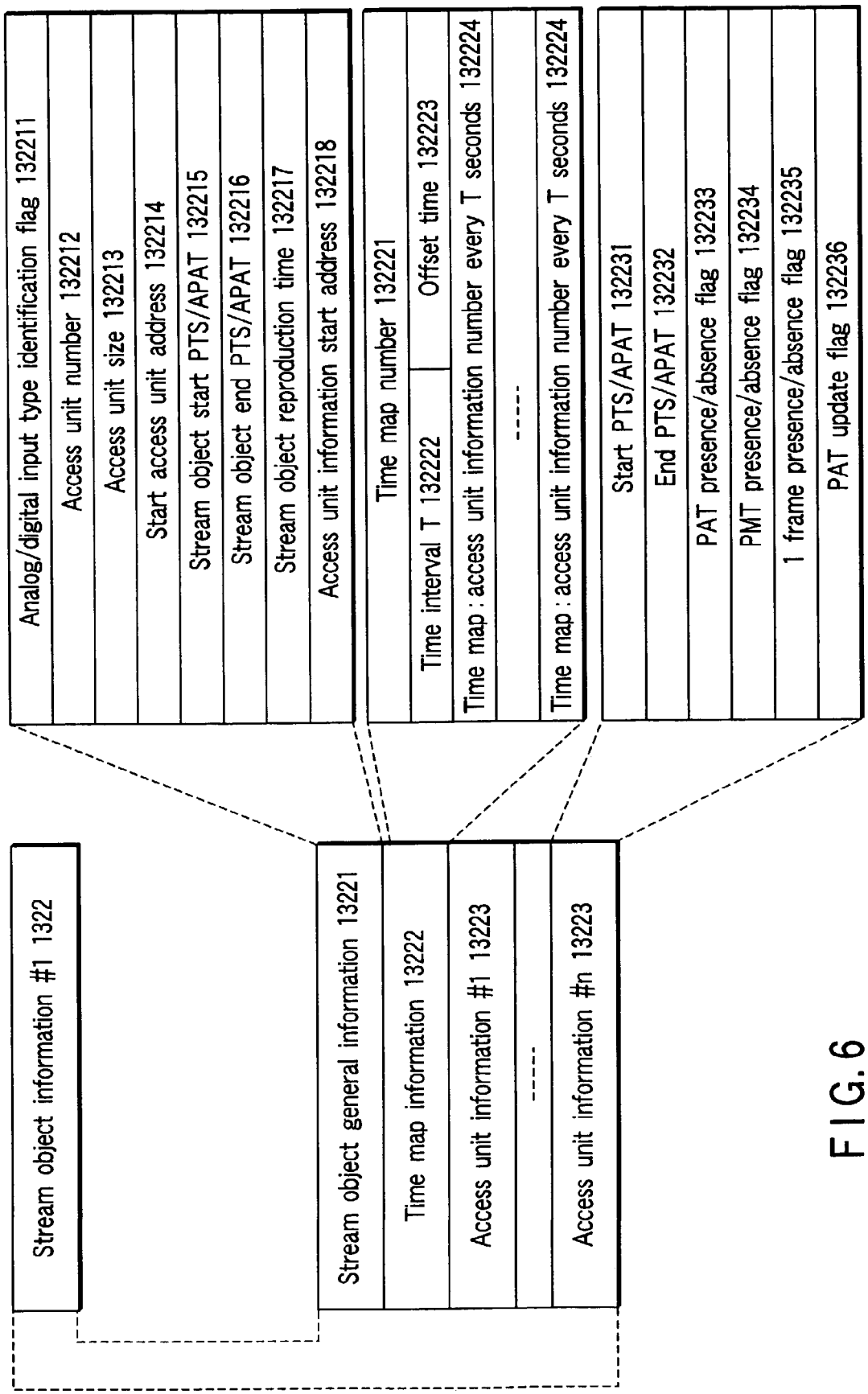
FIG. 6 is an explanatory view of details of stream object information.

FIG. 6 shows content of the stream object information 1322. The stream object information 1322 is constituted of stream object general information 13221, time map information 13222, and one or more pieces of access unit information 13223.

As shown in FIG. 6, in the stream object general information 13221, there are stored: an analog/digital input type identification flag 132211 for identifying whether an input type is analog or digital; an access unit number 132212 stored in the stream object; an access unit size 132213; a start access unit address 132214 indicating a start position of a top access unit; a stream object start presentation time stamp (PTS)/application packet arrival time (APAT) 132215 which indicates a start time of an objective stream object; a stream object end PTS/APAT 132216 which indicates an end time; a stream object reproduction time 132217; and an access unit information start address 132218.

When the stream object start PTS/APAT 132215 and stream object end PTS/APAT 132216 are judged to be analog by the analog/digital input type identification flag 132211, PTS is stored. When they are judged to be digital, APAT is stored.

As shown in FIG. 6, in the time map information 13222, there are stored: a time map number 132221 stored in the time map information 13222; a time interval T 132222 in which an interval of time map can be adjusted by a recording bit rate; an offset time 132223 from the top of the stream object (initial setting is 0, valid value is set by edition); and an access unit information number 132224 which is pointed every time interval of T seconds. This access unit information number 132224 makes possible a quick access by time designation from the user.

In the access unit information 13223, there are stored: a start PTS/APAT 132231 of the access unit; an end PTS/

APAT 132232; a PAT presence/absence flag 132233 indicating whether or not a program association table PAT transmitted by digital broadcasting exists in the access unit; a PMT presence/absence flag 132234 similarly indicating whether or not a program map table (PMT) transmitted by the digital broadcasting exists in the access unit; an I frame presence/absence flag 132235 indicating whether or not an intra-coded (I) picture frame flag exists in the access unit; and a PAT update flag 132236 indicating whether or not the PAT is updated from the precedent access unit.

Figure 7:
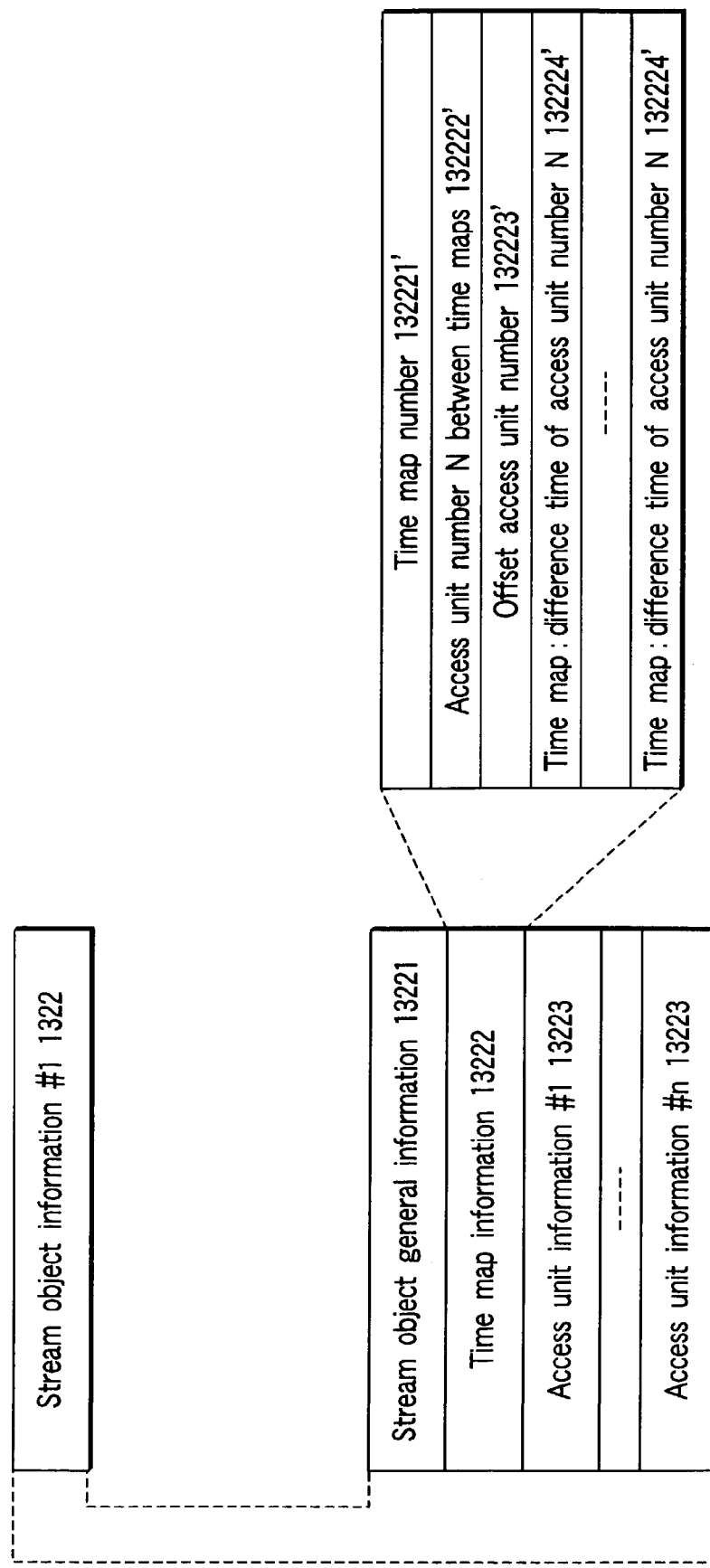
FIG. 7 is an explanatory view showing another example of time map information.

FIG. 7 shows another example of the time map information 13222 shown in FIG. 6. As shown in FIG. 7, the time map information 13222 is constituted of: a time map number 132221' stored in the time map information 13222; the number of access units disposed between the time maps 132222'; an offset access unit number 132223' from the stream object top (initial setting is 0, valid value is set by edition); and a difference time 132224' of the access unit number N in which a difference time between the top time and the next top time is mapped every access unit number N. When the difference time 132224' is added, the quick access by time designation from the user is possible similarly as FIG. 6.

Figure 8:
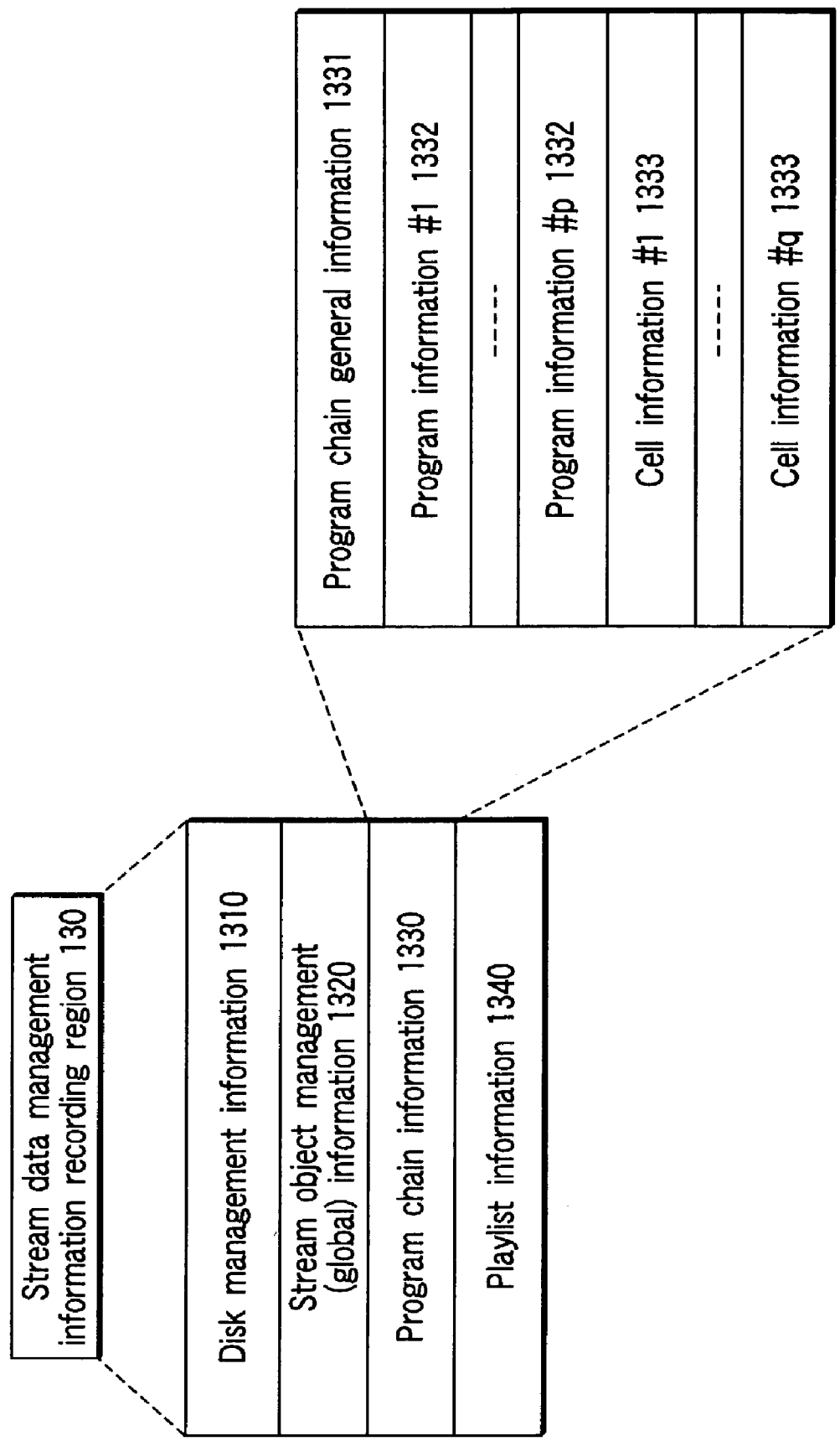
FIG. 8 is an explanatory view of details of program chain information.

FIG. 8 shows content of the program chain information 1330. This program chain information 1330 is constituted of: program chain general information 1331; one or more pieces of program information 1332; and one or more pieces of cell information 1333.

Figure 9:
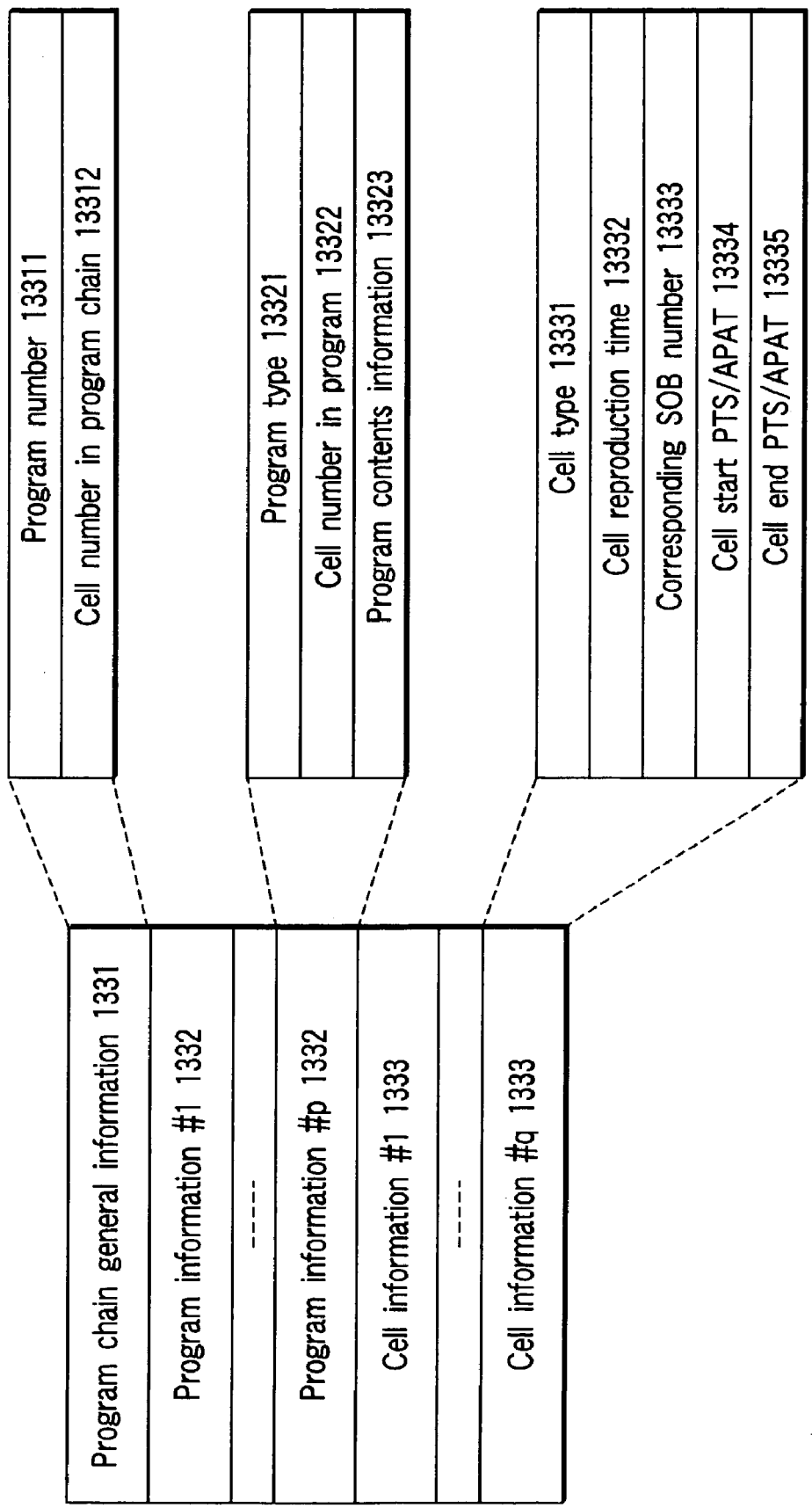
FIG. 9 is an explanatory view of further details of the program chain information.

As shown in FIG. 9, the program chain general information 1331 includes the number of programs 13311 included in a program chain, and the number of cells 13312 included in the program chain.

Moreover, the program information 1332 includes: a program type 13321 including a flag indicating whether or not the program is protected from deletion; the number of cells 13322 in the program; and program contents information 13323 indicating contents such as the program name.

Furthermore, the cell information 1333 includes: a cell type 13331 including information indicating analog or digital recording; a cell reproduction time 13332; a corresponding SOB number 13333 indicating the stream object corresponding to the cell; a cell start PTS/APAT 13334; and a cell end PTS/APAT 13335.

Figure 10:
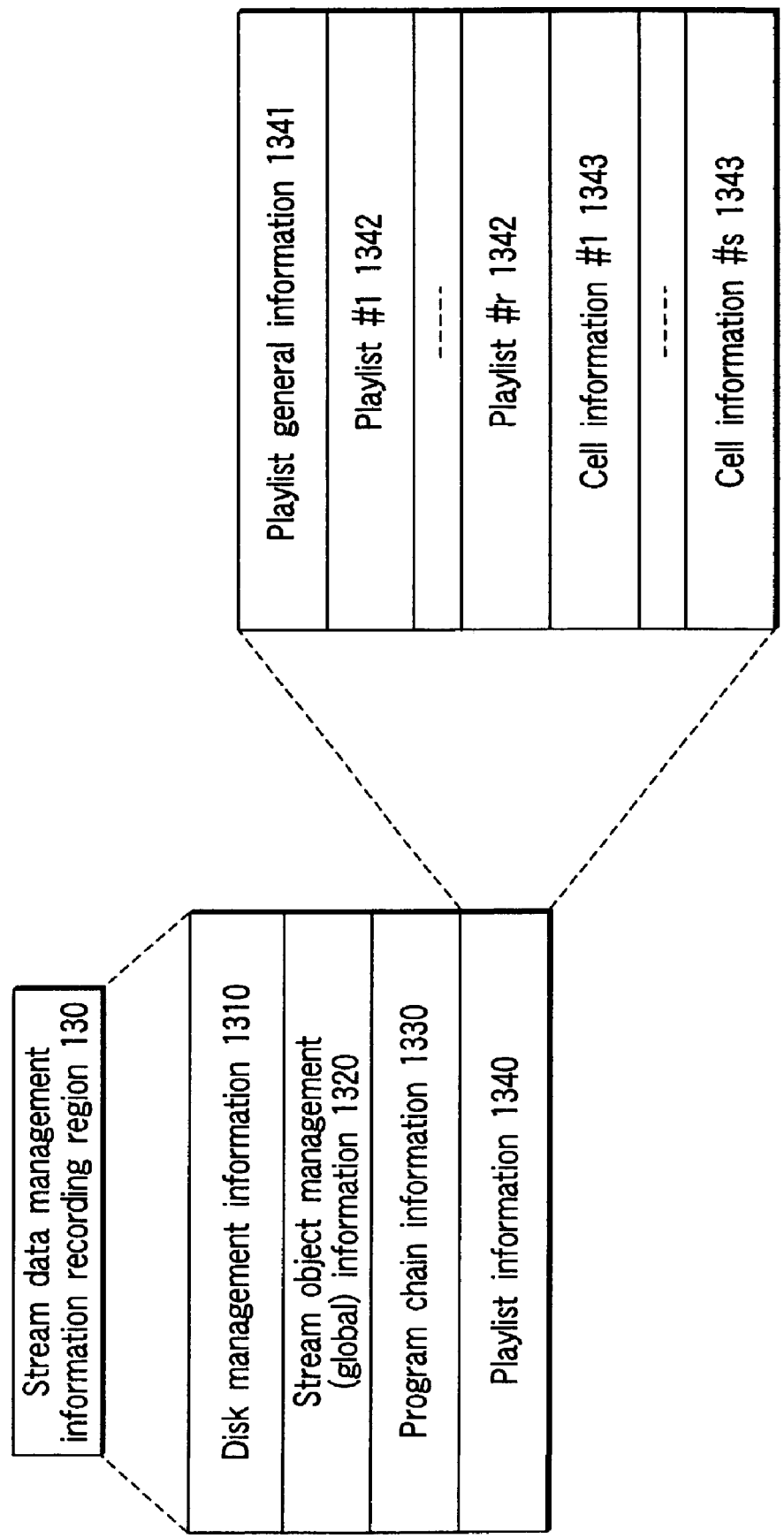
FIG. 10 is an explanatory view of details of playlist information.

FIG. 10 shows content of the playlist information 1340. The playlist information 1340 is constituted of playlist general information 1341, one or more playlists 1342, and one or more pieces of cell information 1343.

Figure 11:
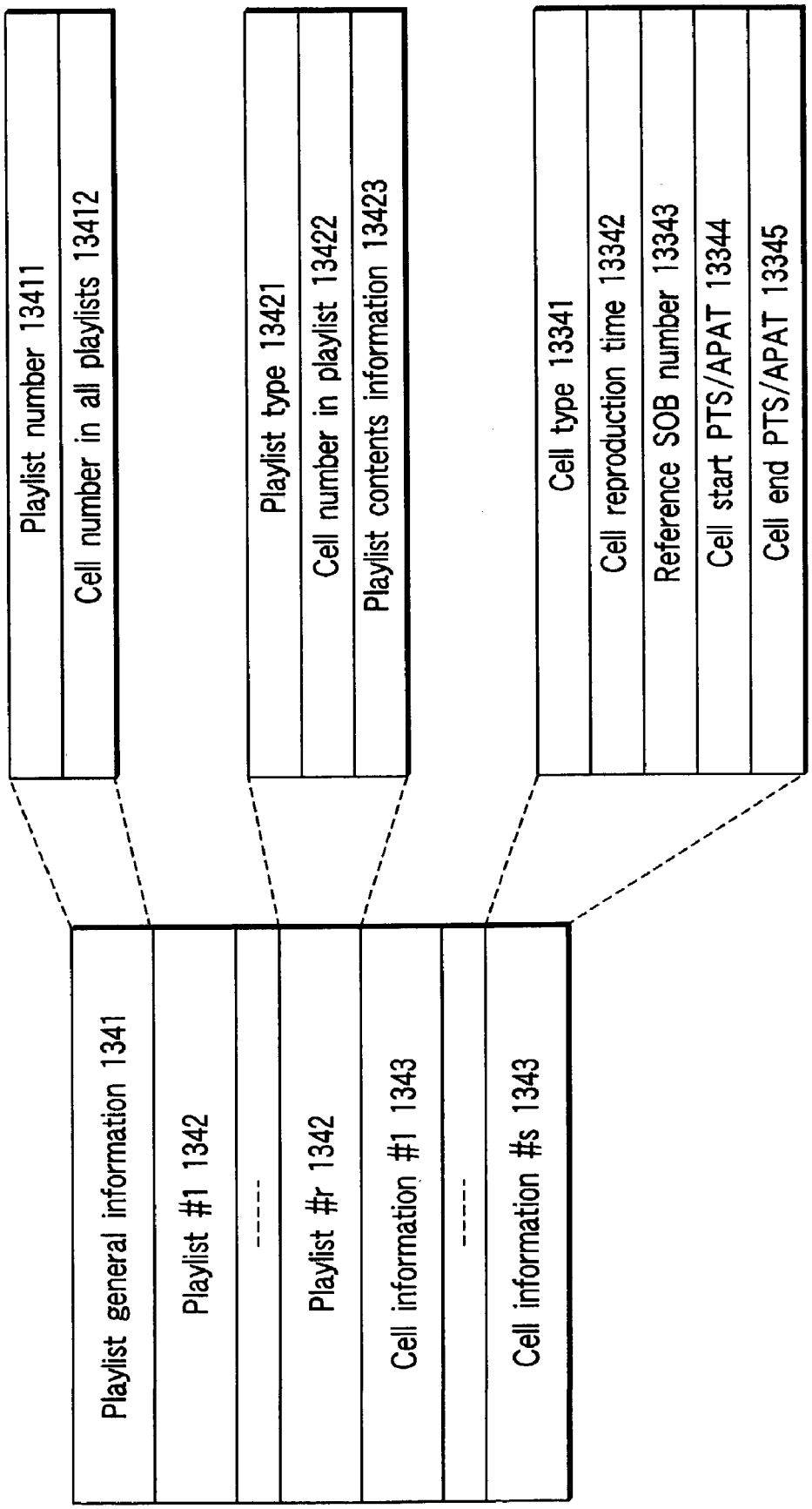
FIG. 11 is an explanatory view of further details of the playlist information.

As shown in FIG. 11, the playlist general information 1341 includes the total number of playlists 13411 included in the playlist information 1340, and the number of cells 13412 included in all the playlists.

Moreover, the playlist 1342 includes: a playlist type 13421 including a flag indicating whether or not the playlist is protected from deletion; the number of cells in the playlist 13422; and playlist contents information 13423 indicating contents input by the user such as a title name of the playlist.

Furthermore, the cell information 1343 includes: a cell type 13431 including information indicating the analog or digital recording; a cell reproduction time 13432; a corresponding SOB number 13433 indicating the stream object corresponding to the cell; a cell start PTS/APAT 13434, and cell end PTS/APAT 13435.

Figure 12:
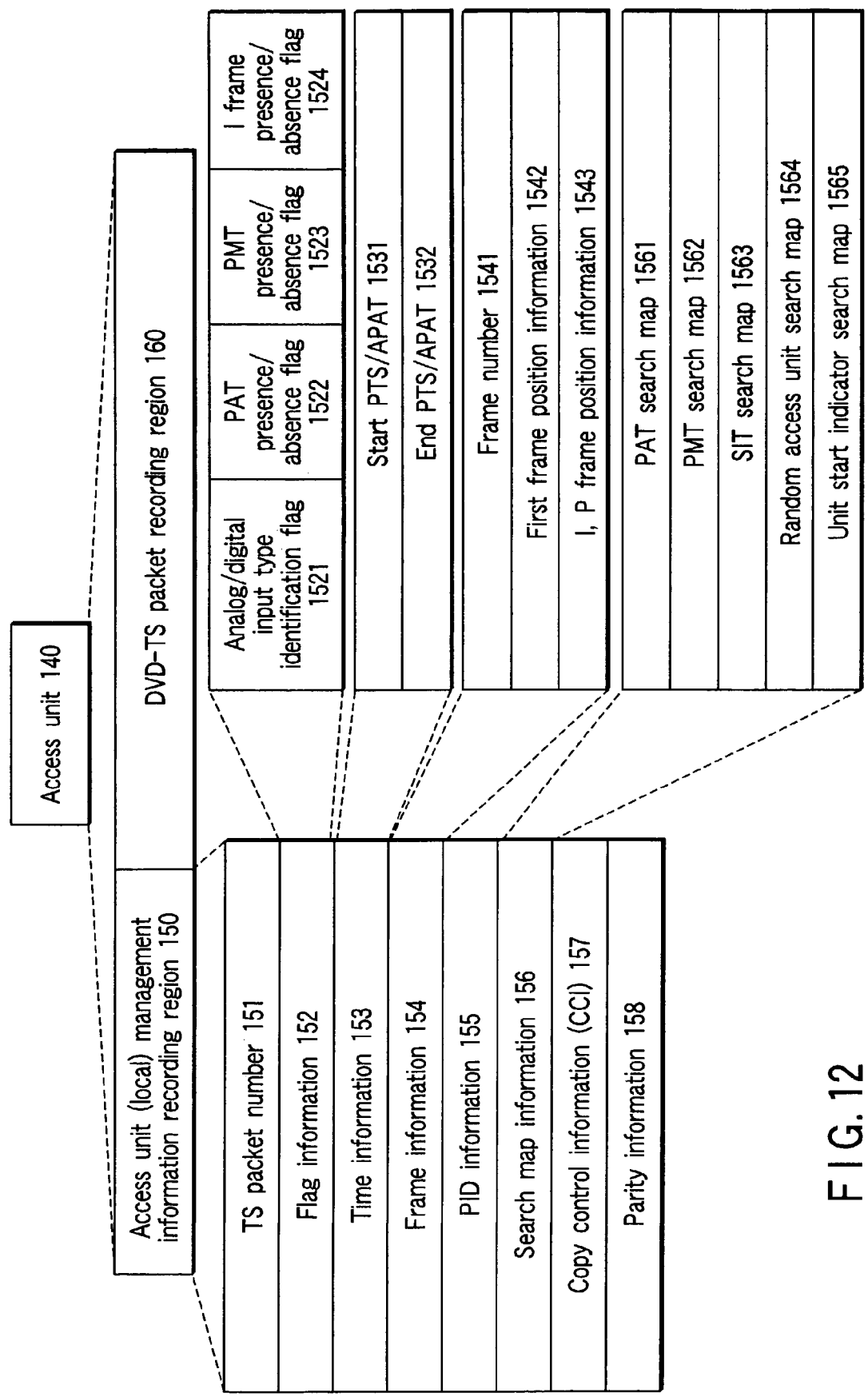
FIG. 12 is an explanatory view of information stored in an access unit (local) management information recording region.

FIG. 12 shows a content of the access unit management information recording region 150 included in the access unit 140. In the access unit management information recording region 150, information concerning the access unit is stored. That is, the information includes: the number of TS packets in the access unit 151; various types of flag information 152; time information 153; frame information 154; PID information 155 in which all packet identifiers (PID) included in each packet are stored; search map information 156; copy control information (CCI) concerning the access unit 157; and parity information 158 which can be used in error check and correction with respect to the access unit management information.

As shown in FIG. 12, the flag information 152 includes an analog/digital input type identification flag 1521, PAT presence/absence flag 1522, PMT presence/absence flag 1523, and I frame presence/absence flag 1524.

The analog/digital input type identification flag 1521 is a flag identifying whether an input type is analog or digital. The PAT presence/absence flag 1522 is a flag indicating whether or not the program association table PAT transmitted by the digital broadcasting exists in the access unit.

The PMT presence/absence flag 1523 is a flag similarly indicating whether or not the program map table PMT for acquiring the image/sound of the program transmitted by the digital broadcasting exists in the access unit. Moreover, the I frame presence/absence flag 1524 is a flag whether or not the I picture frame flag exists in the access unit.

The time information 153 includes an access unit start PTS/APAT 1531 and end PTS/APAT 1532. Moreover, the frame information 154 includes the number of frames 1541 in the access unit, first frame position information 1542 in the access unit, and position information 1543 of each of I and predictive-coded (P) frames.

The search map information 156 includes: a PAT search map 1561 indicating a TS packet position in which each information included in the access unit exists in a map; a PMT search map 1562; a selection information table (SIT) search map 1563 which is information concerning the program content transmitted by the digital broadcasting; a random access unit search map 1564 indicating the presence of the I frame; and a unit start indicator search map 1565 indicating the presence of each frame.

In this embodiment, local management information (management data herein) and audio video (AV) data exist in the access unit in a mixed manner. Therefore, a request for reliability concerning each information differs. In the embodiment, reliability enhancement of the local management information is therefore realized in the following system.

In conventional AV recording/reproducing, the AV data and management data are not simultaneously recorded with respect to a physical disk, and different recording processes are performed in a physical layer such as drive.

For example, for the DVD, since the data processing in the drive is performed by a data unit with an error correction code attached thereto called the ECC block constituted of a plurality of sectors, a method comprises performing the recording/reproducing by the unit of the ECC block in operating application and changing a process method.

Figure 13:
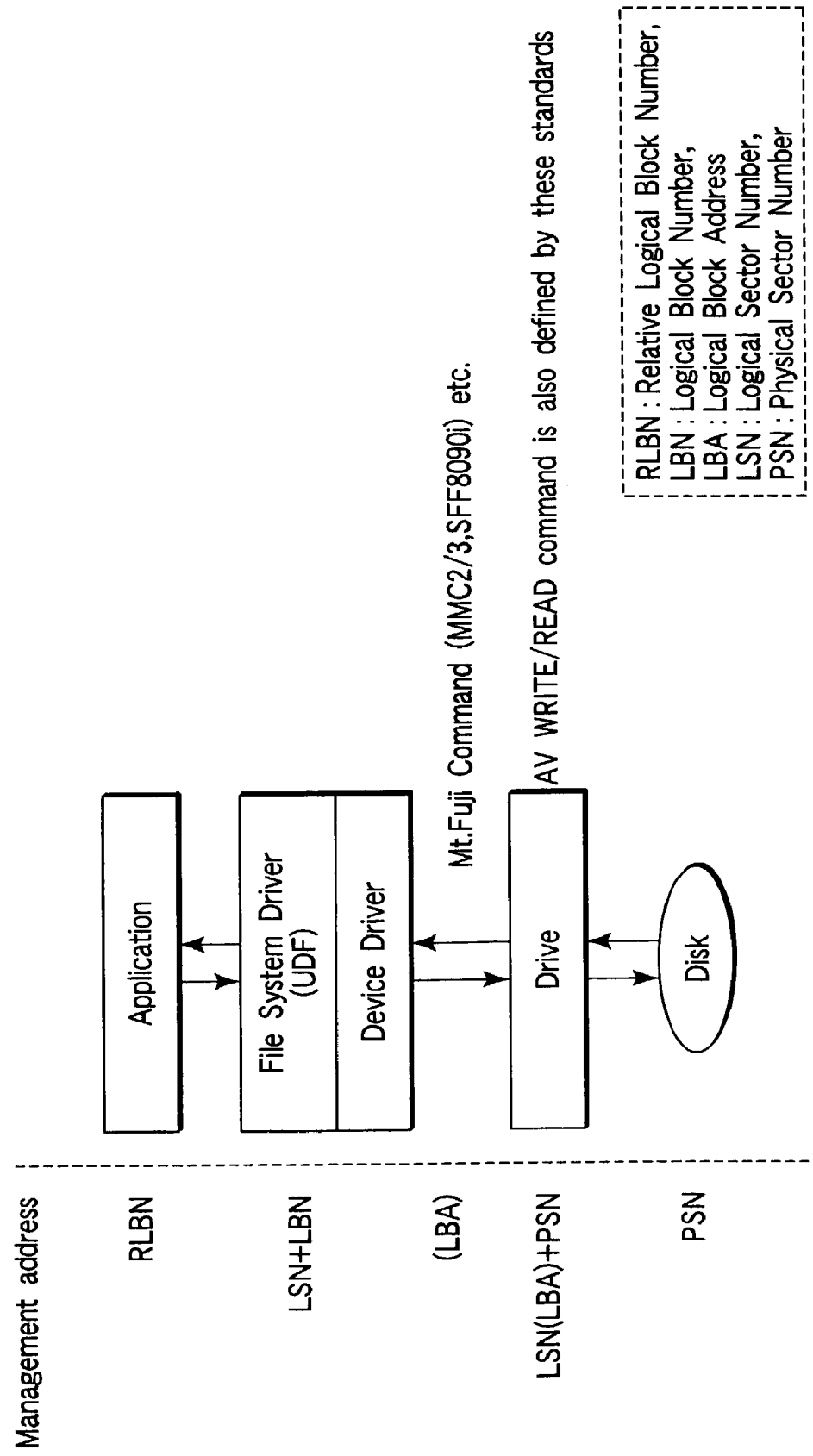
FIG. 13 is an explanatory view of a relation between each layer and management address space.

One example of a general system for performing AV recording is shown in FIG. 13. The AV information is recorded on the disk or reproduced from the disk via a plurality of layers such as an application engine, file system, device drive, and drive.

The definition of a management address differs with each layer. An address conversion operation is necessary, when the information goes between the layers. In AV, especially DVD-VR application, the management is executed by an address referred to as a relative logical block number (RLBN).

The whole file system is allocated in LSN, but a user file is managed by a logical block number (LBN) which is an address in a partition.

A command defined mainly by standards (MMC2/3, SFF8090i, and the like) is used to control a device driver with respect to the drive. Access to a user data portion is made using a logical block address (LBA).

In the drive, LSN corresponding to LBA is interpreted, and a physical sector number (PSN) is used to execute actual processing inside the drive. For example, for DVD-RAM, since the drive includes a mechanism of defect management, the address excluding a defective sector is allocated as LSN, and therefore an unused PSN exists.

When a high-order layer including the file system is assumed as a host, the host issues a PC-based command weakly restricted by processing time and an AV-based command strongly restricted by processing time with respect to the drive.

For example, since reliability is prioritized with respect to PC data, verification is performed at recording time, and a secondary switch process is executed if necessary. At reproduction time, the error correction process, and retry such as re-read are usually performed. When a reproduction error is generated, the drive returns an error to the host.

On the other hand, for the AV data, since real time property is required rather than the reliability, the verification at recording time, and secondary switch process are not performed. Even when the error cannot be corrected or can be incompletely corrected at reproduction time, processing different from that for the PC data is executed. For example, the error is returned to a position in which the error can be corrected, or specially allocated data (all 00 or FF) is returned.

The accesses to the reliability-oriented data and real-time property-oriented data are clearly distinguished by a command. Therefore, the drive judges with respect to the command sent from the host whether the reliability or real time property is prioritized in order to execute the processing.

With this command system, the data is processed in each layer by the type of data as an object. When the AV data and data for managing the AV data handled in the application layer are distinguished in this viewpoint, the former data is treated as real-time property-oriented and the management data is treated as reliability-oriented. Therefore, the file has been distinctively managed. That is, an AV data portion is processed by an AV command (the real time property is regarded as important) and a PC command is used with respect to a management data portion (the reliability is regarded as important).

Figure 14:
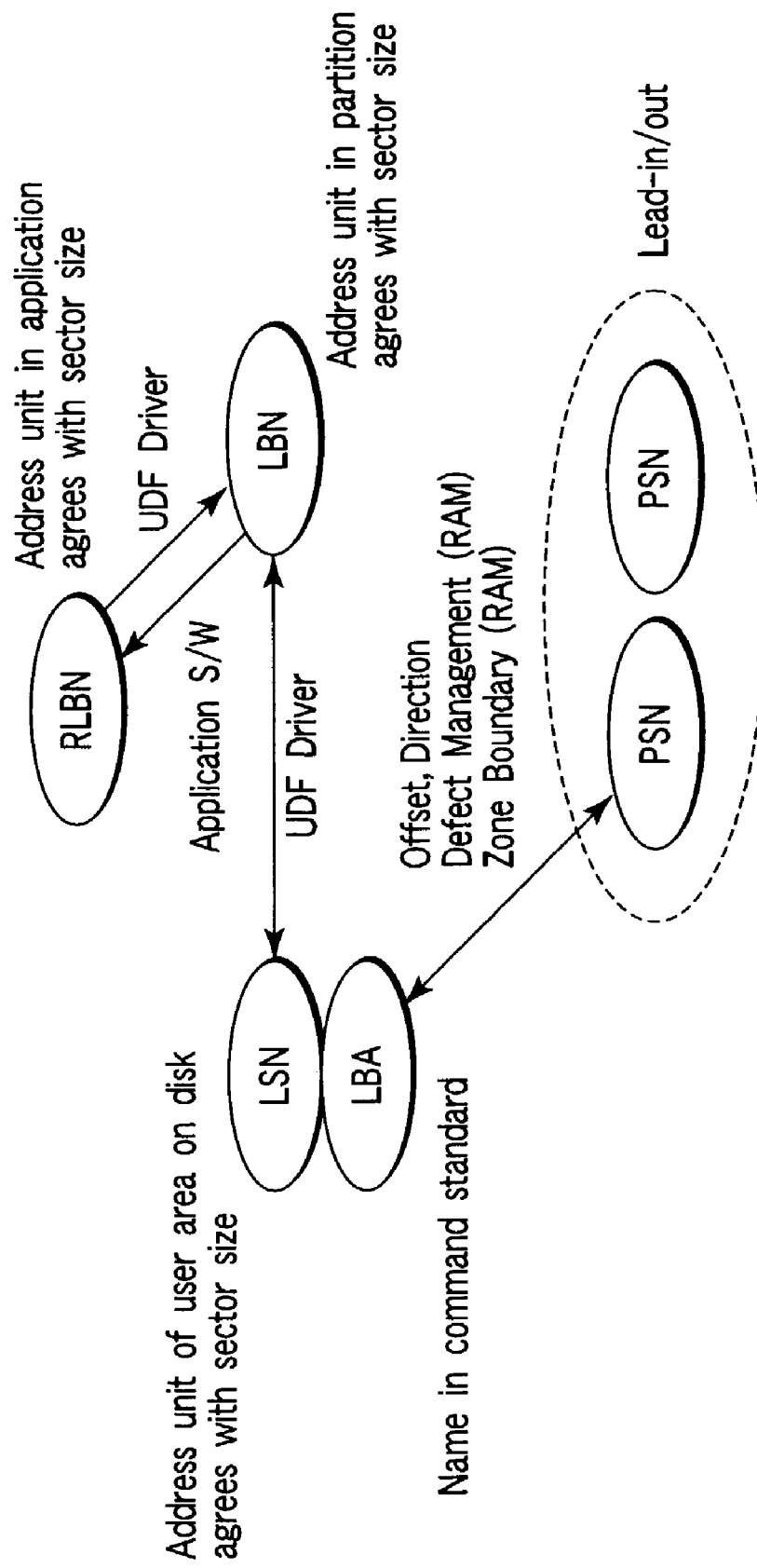
FIG. 14 is an explanatory view of a relation among management addresses.

FIG. 14 shows a relation between address portions in the system diagram of FIG. 13. The application herein refers to DVD-VR. RLBN is an address in the application, and a unit corresponds to a sector size.

That is, a layout of application accords with a physical sector size. However, in the application, RLBN is a continuous address space and does not correspond to the actual arrangement on the physical disk. The application data managed by this RLBN is arranged in the partition by the LBN address managed by the file system (UDF).

The unit of LBN handled in the file system also agrees with the sector size. The drive is processed by LBA, LSN equivalent to LBA is converted to PSN in the drive, and the PSN is processed in the drive.

For example, in the drive, a plurality of sectors to which the ECC block as a parity is added are actually processed as one unit. In the DVD, 16 sectors correspond to one ECC block. For the DVD, even when the single sector is read out, the ECC block (16 sectors) is read out in the drive. After the error correction process is performed, target sector information is taken out and sent to the host.

Similarly at recording time, even when one sector recording is performed, other 15 sectors are added and the ECC block is constituted and recorded. If the recording is performed with respect to the recorded block by the sector unit, a recording operation is performed through a read modify write.

This includes a procedure of: first reading out the whole ECC block including the target sector; patching the target sector; re-constructing the ECC block; and recording the whole block.

It is necessary to execute the processing of application data assuming that the drive follows the process procedure. If not, a useless process is generated, and it is difficult to execute a real-time process. For the DVD, the AV data is handled by the ECC block unit.

In a general system, the management data and AV data have not been mixed within a process unit. However, in the embodiment, the management data and AV data are mixed in AU.

In this case, when the AV data is processed by the AV command in the drive, the management data cannot be treated with high reliability. Moreover, when the management data is processed by the PC command, it is impossible to secure the real time property.

As a necessary function for the application, the management data in AU has high reliability, and the AV data is processed at high speed. Then, in the embodiment, it is important to correct the error in the application layer.

Figure 15:
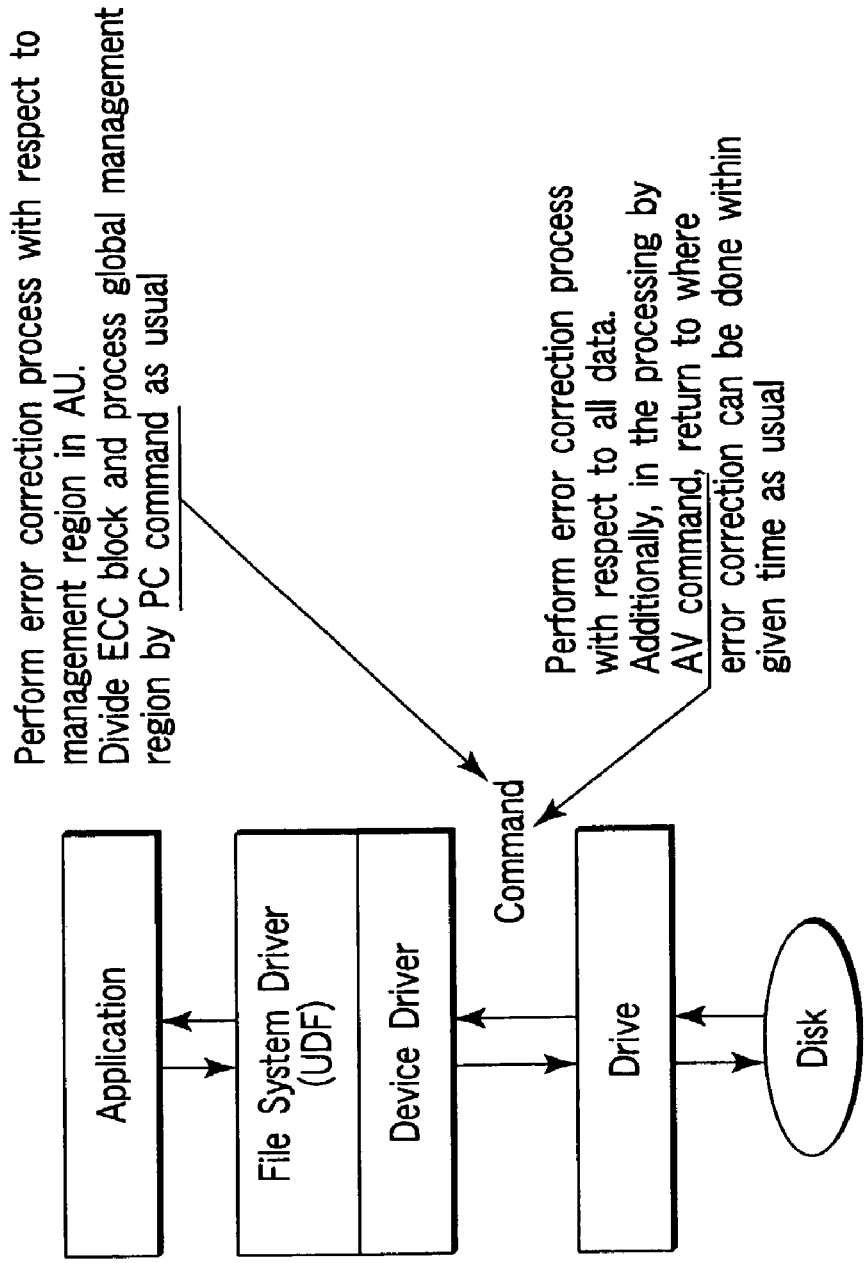
FIG. 15 is an explanatory view of a share of an error correction process.

FIG. 15 schematically shows divisions of other processes. That is, in the application layer, the error correction process is performed with respect to the management region in AU. With respect to the global management region, the ECC block is divided and the region is processed by the PC command as usual.

The drive performs the error correction process with respect to the previous data as usual. Also for the processing of the AV command, similarly as a general system, even if the error correction is impossible, the error is not generated, and the corrected portion of the error is returned to the host.

In this constitution, for the access to AU, the AV command is used to secure the real time property, and the management data portion is subjected to the error correction process in the application. It is possible to establish both the reliability and real time property as a system.

FIG. 16 shows the constitution example of the ECC block of DVD. For the ECC block, parities are added to the data in the lateral and longitudinal directions. For the block to which the parities are added, intermediate processes such as interleave, and changing of the data order are performed, and the block is divided into a plurality of sectors.

The plurality of sectors constitute the ECC block, and the ECC block is handled as a unit for correcting the error at recording/reproducing time in the drive. That is, even to exchange the data with the host by the sector unit, in the drive, after the data is processed by the ECC block unit, the data is segmented by the sector unit and exchanged with the host.

FIG. 17 shows characteristics of the processing in each layer in a case in which the AV data is recorded. That is, the AV data and management data are managed in different methods in the respective layers. The reason why the data is managed in the different methods is that levels of speed and reliability required for the data are different.

Real-time control is necessary for the AV data. Even when some data includes the error, this does not substantially raise a problem. On the other hand, since the management data is normally buffered and processed in a memory inside the apparatus in many cases, the access speed between the disks does not raise many problems, and the reliability of the data is regarded as important.

Assuming that the levels required for the data differ in this manner, in the application, the management data and AV object data are divided into separate files, and the respective files are further arranged in the different ECC blocks.

In the file system, added file attributes differ. The commands of the host and drive are divided for AV and PC. Even the drive does not perform the secondary change process with respect to the AV data. For the disk, it is possible to add attribute information for distinguishing the AV data to the sector or ECC block so that the drive can perform an appropriate process.

In a structure in which the processing unit in the application of the recording/reproducing in the AV recording is assumed and which is divided into a global management area for managing the whole AU and a local management area for managing each AU and managed, a method of adding the parity to the management portion in AU includes four methods: a multiplex method; a complete dispersion method; a partial dispersion method; and a partial dispersion multiplex method.

These four methods will be described with reference to FIGS. 18A to 18G. The AU is constituted of one or more ECC blocks. Arrangement examples of the management data portion and object data portion are shown herein.

In FIG. 18A, the management data portion is disposed at the top of AU. The parity is added to the management data portion. When the management data portion has a defect, the error correction process is performed and it is thereby possible to restore correct data.

FIGS. 18B, 18C show examples in which the management data portion is disposed at a back end or at front and back ends. When the portion is disposed at the front/back end, a copy of the front end is disposed at the back end (redundantly). Even if one end cannot be read, the other end can be used to read out the data.

FIG. 18D shows an example in which the management data portion is separated, for example, by one byte data unit and the divided portions are arranged substantially equally in the AU. Since the portions are dispersed and arranged in this manner, the influence of dirt attached to the disk is not exerted in a concentrated manner.

Conversely, as shown in FIG. 18A, the portion is entirely disposed at the front end. When there is dirt in the portion, the error goes beyond error correction capability. The possibility that the management data cannot be reproduced increases.

When the management data portion is completely dispersed, the portion is reinforced against the defect. However, the time in which only the management data portion is read out of the disk lengthens more. To solve the problem, the arrangements of FIGS. 18E, 18F, 18G are also considered.

That is, the portions are arranged in the concentrated manner to some degree, and arranged in a dispersed manner within the range if possible. By this arrangement, the speed of data readout is not sacrificed very much, and reliability can be secured.

Figure 19:
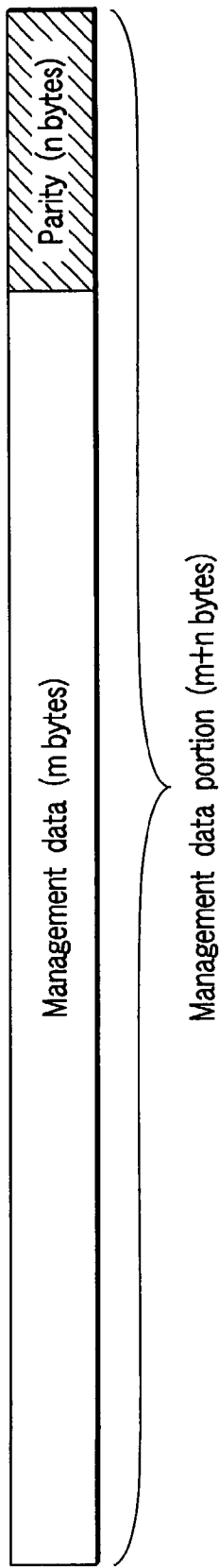
FIG. 19 is an explanatory view of an example of data encode of a management data portion.

FIG. 19 shows one example of the method of adding the parity to the management data. A Read-Solomon code is an encode system for broad use in DVD. A relation of a generation equation in adding a parity of n bytes to the management data of m bytes is shown herein.

That is, a Galois body is defined by an element of a primitive polynomial. In the polynomial, calculation is performed. A surplus polynomial corresponds to the parity. A surplus obtained by dividing the corresponding surplus polynomial in the management data by a predefined generation polynomial forms a parity.

When the surplus is added, and the generation polynomial is divided without any error, the surplus is zero. When a defect is generated in the management data portion generated in this manner because of dust attached to the disk, and division is performed by the generation polynomial at the reproduction time, the surplus indicates a value other than zero. When the mathematical relation is used with respect to the received data, it is possible to correct the error.

When a read Solomon code RS (m+n, m, n+1) is used, the following definition is possible. In a primitive polynomial $P(X)=X^8+X^4+X^2+X+1$, a surplus polynomial (parity) is assumed as follows:

$$R_j(X) = \sum_{k=m}^{m+n-1} B_{i,j} \cdot X^{m+n-1-i}$$
$$= \{I_j(X) \cdot X^n\} \bmod \{G_p(X)\}$$

wherein an information polynomial (management data entity) is as follows:

$$I_j(X) = \sum_{i=0}^{m-1} B_{i,j} \cdot X^{m-1-i}$$

and the generation polynomial is as follows.

$$G_p(X) = \prod_{k=0}^{n} (X + a^k)$$

Figure 20:
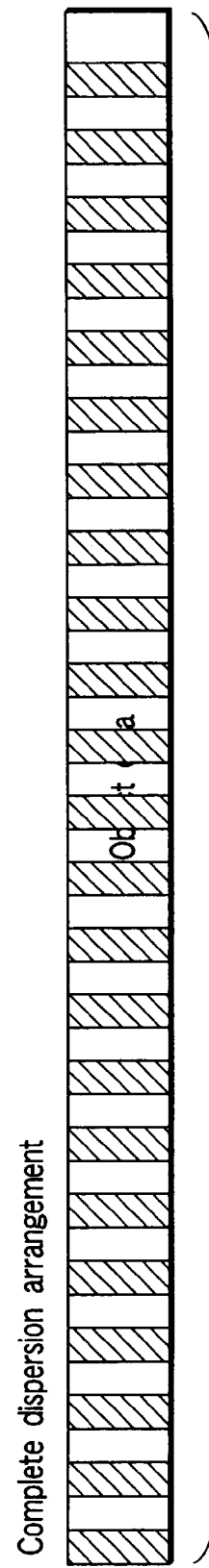
FIG. 20 is an explanatory view of complete dispersion arrangement of management data.

FIG. 20 shows an example in which the management data portions (management data having the parity) are dispersed in the AU by a byte unit.

Figure 21:
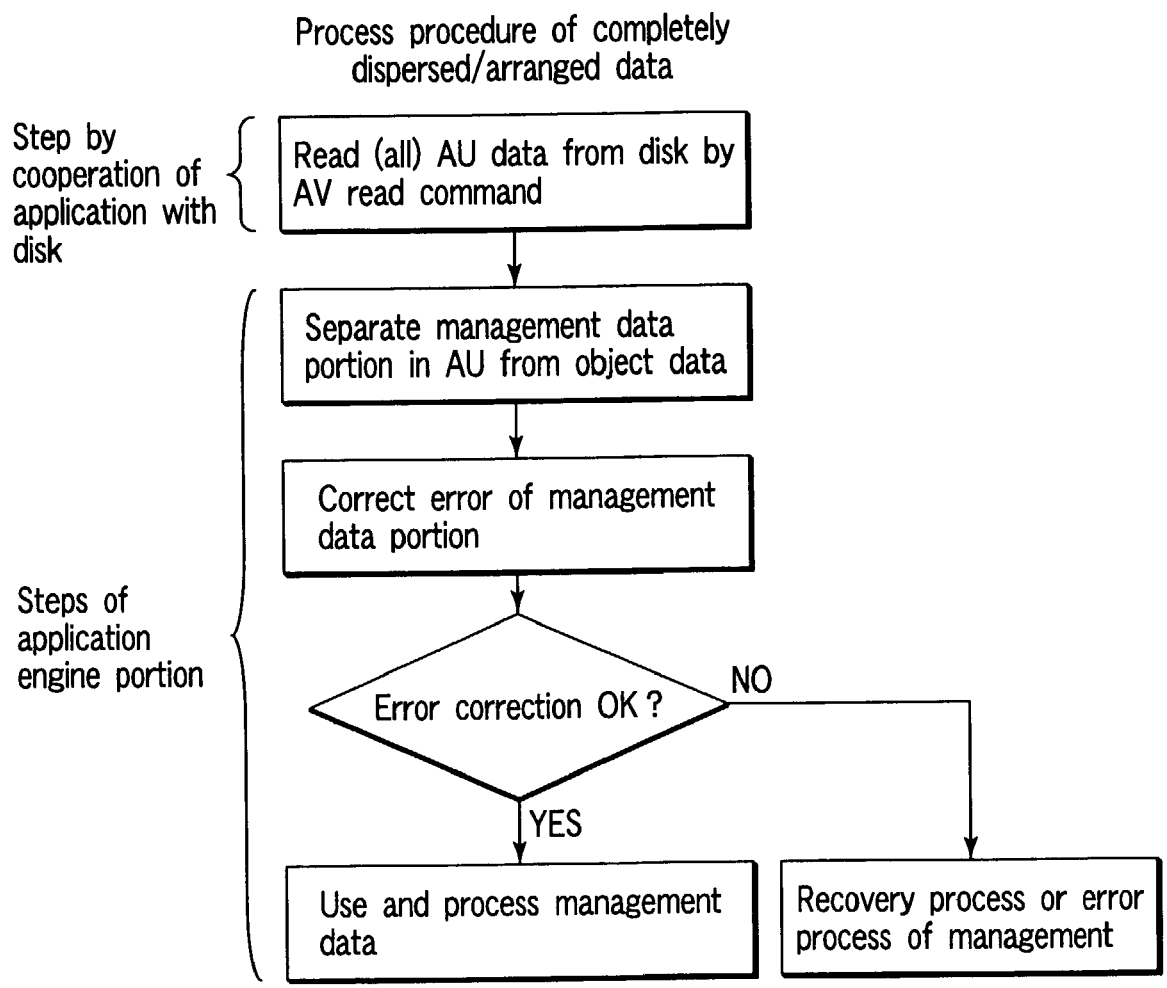
FIG. 21 is a flowchart showing a processing procedure of completely dispersed/arranged management data.

FIG. 21 shows a process procedure of completely dispersed/arranged data at the reproduction time. First, the data is read out of the disk. At this time, the host uses an AV read command to instruct the drive to send all AU data. Only the management data portion is extracted from the extracted AU.

The process after extracting the AU is performed on a host side (application engine). Since the parity is attached to the management data portion, the division is performed by the generation polynomial, and presence/absence of the error is checked. When there is an error, the error is corrected. At this time, with the number of errors in a range which can be corrected by the added parity, the errors can be corrected. However, when the number exceeds the range, correction is impossible.

In reality, when the correction is performed to a code capability limitation, originally correct data is changed. The possibility that such wrong correction occurs increases. Therefore, an upper limit of the correction is restricted in many cases.

If the error correction is OK (even without the error), the management data is used to execute the processing. If the error correction is impossible, a recovery process of the management data is performed, or an error processing mode is achieved. For example, recovery means a step of re-calculating the management data from context.

Figure 22:
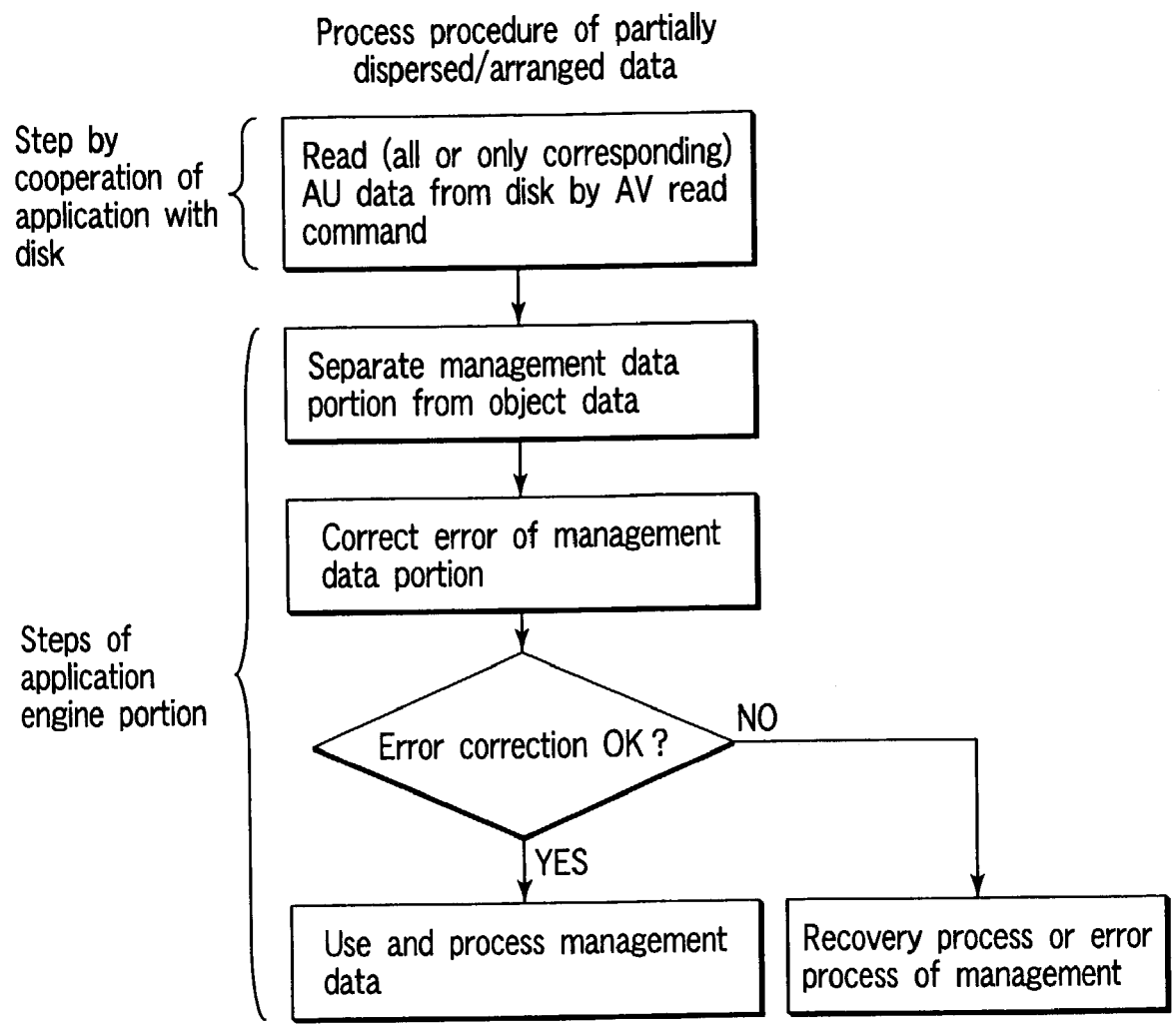
FIG. 22 is a flowchart showing a processing procedure of partially dispersed/arranged management data.

FIG. 22 shows a process procedure of partially dispersed/arranged data at reproduction time. The partial dispersion/arrangement is substantially similar to the complete dispersion/arrangement in a method of disposing the portion in only the front or back end, or restricting the arrangement range to some degree and dispersing the portions in the range, and in the processing method.

Figure 23:
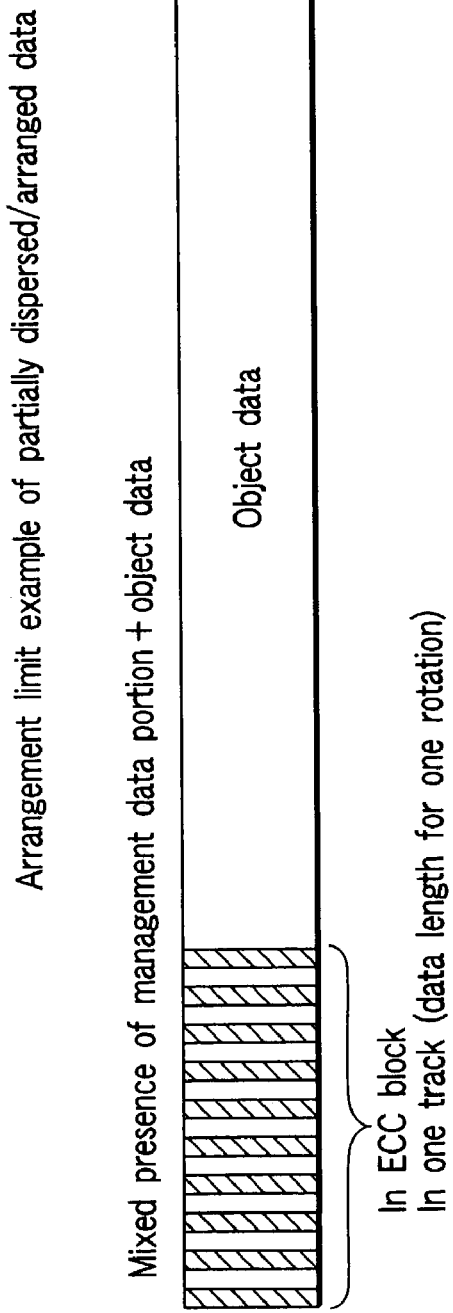
FIG. 23 is an explanatory view of an arrangement limit of the partially dispersed/arranged management data.

In the partial dispersion/arrangement, as shown in FIG. 23, when the format of the disk to be recorded is known beforehand, layout is preferably constituted in accordance with the format. The AU is constituted of one or more ECC blocks. Moreover, since the processing in the drive is performed by one ECC block, the processing time does not change in one ECC block.

Therefore, when the size of the management data portion is within one ECC block, and the portions are dispersed in one ECC block, the processing time does not change. Even when the number of ECC blocks exceeds one, the dispersion range is limited by the ECC block unit in a similar way of thinking. Thereby, the influences of defects can be dispersed without changing the processing time.

Another viewpoint is the size of one rotation of the disk. When dust sticks to the disk, the adjacent track is also influenced by the dust with high possibility. Therefore, it is desirable not to arrange the portions over a plurality of tracks.

Figure 24:
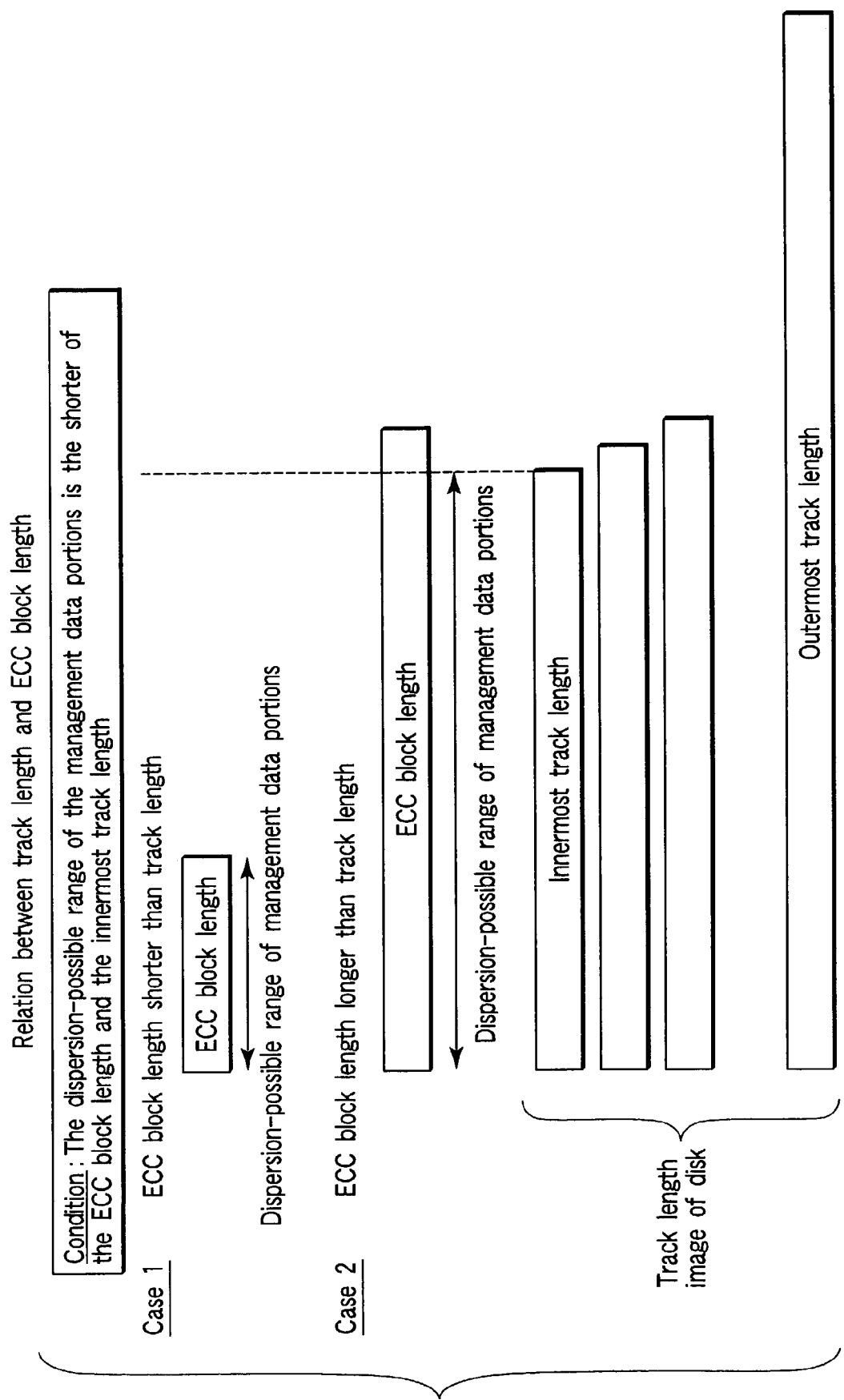
FIG. 24 is an explanatory view of a relation between track length and ECC block length.

In the disk, the track on an inner peripheral side is short, and the track on an outer peripheral side is long. Therefore, as shown in FIG. 24, it is also effective to disperse the portions in a range which is not more than the data size for one rotation of an innermost circumference, so that the portions are not arranged over the plurality of tracks. Of course, when the management data amount is not less than one circumference, the portions may be arranged over the plurality of tracks. That is, the partial dispersion is performed on restricted conditions of ECC boundary and track number.

Figure 25:
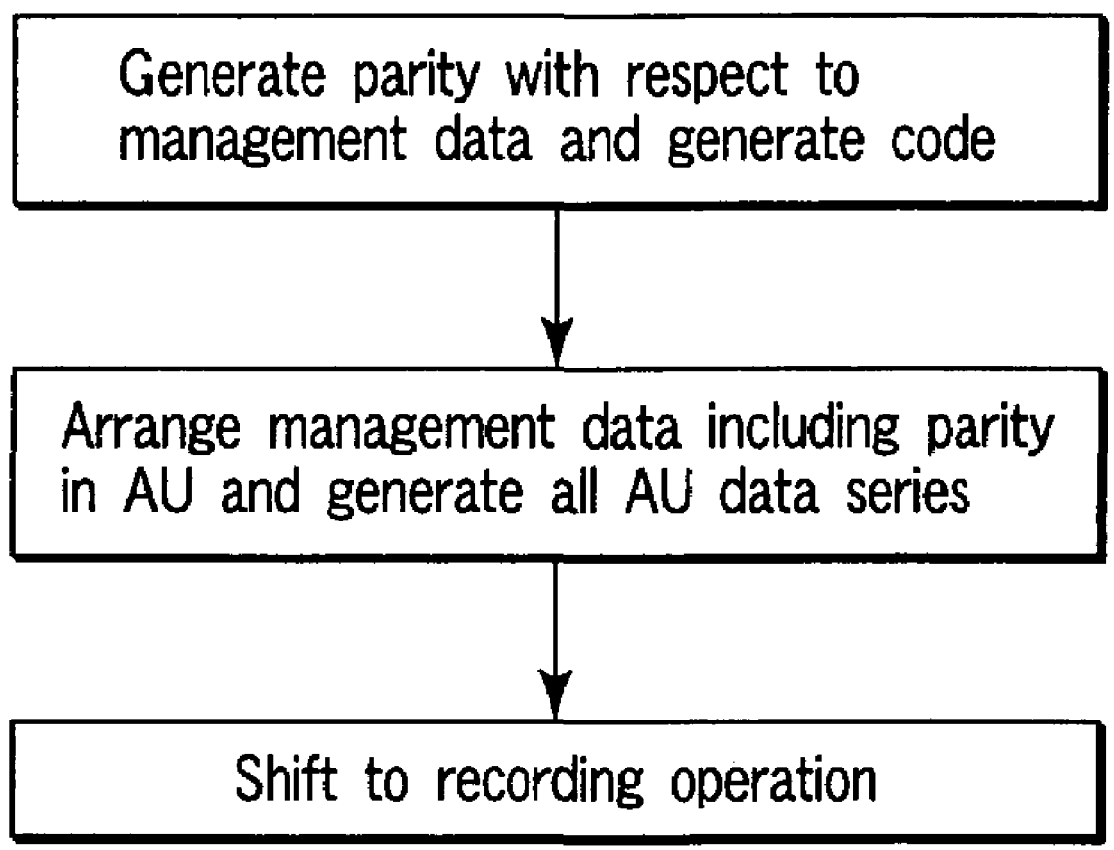
FIG. 25 is a flowchart showing a data generation procedure of the access unit.

As shown in FIG. 25, the parity to be added to the management data of AU is generated by an application engine.

Moreover, in this embodiment, it is important to dispose local management information and reduce a data amount held in the memory. Therefore, determination of the size of the access unit has an important meaning.

Since an integer number of data packets (MPEG-TS packets in this embodiment) are recorded especially in the AU, a region generated by a difference between the ECC block and an assembly of data packets is effectively used. This is necessary for enhancement of recording efficiency.

In this embodiment, in consideration of the above-described problem, the size of the access unit au_size (bytes) is calculated based on the following way of thinking.

Assuming that one access unit performs the reproduction of t1 to t2 (sec), a maximum transfer rate of the data to be recorded is max_rate (Mbps: megabits per second), and a minimum transfer rate is min_rate (Mbps), the following equations are established.

$$t1 \le \frac{au\_size \times 8}{max\_rate} \le t2$$

$$t1 \le \frac{au\_size \times 8}{min\_rate} \le t2$$

Therefore, the size of the access unit is obtained from the equation 2 and represented as follows.

$$\frac{max\_rate \times t1}{8} \le au\_size \le \frac{min\_rate \times t2}{8}$$

That is, assuming that the size of one ECC block is ecc_size, the number of ECC blocks ecc_in_au per access unit is represented as follows.

$$\frac{max\_rate \times t1}{8 \times ecc\_size} \le ecc\_in\_au \le \frac{min\_rate \times t2}{8 \times ecc\_size}$$

For example, in broadcasting satellite (BS) digital broadcasting, there is a transfer capacity of 22 slots (about 26.4 Mbps) for high definition television (HDTV), and a transfer capacity of six or eight slots (about 7.2 or 9.6 Mbps) for SDTV. Additionally, when TC8PSK is used in a modulation system and an error correction code is not included, one slot corresponds to about 1.2 Mbps.

On the other hand, when the access unit is assumed as an edition unit, one edition unit preferably corresponds to image, sound, or data of about 0.5 to two seconds. That is, the following equations are established.

$$0.5 \le \frac{au\_size \times 8}{26.4 \times 10^6} \le 2.5 \text{(for 22 slots)}$$

$$0.5 \le \frac{au\_size \times 8}{7.2 \times 10^6} \le 2.5 \text{(for six slots)}$$

Therefore, the size of the access unit is 1650000≤au_size≤2250000. When the size of the ECC block is 64 KB, the unit size is 26≤ecc_in_au≤34. That is, the number of ECC blocks per access unit is preferably about 32.

Figure 26:
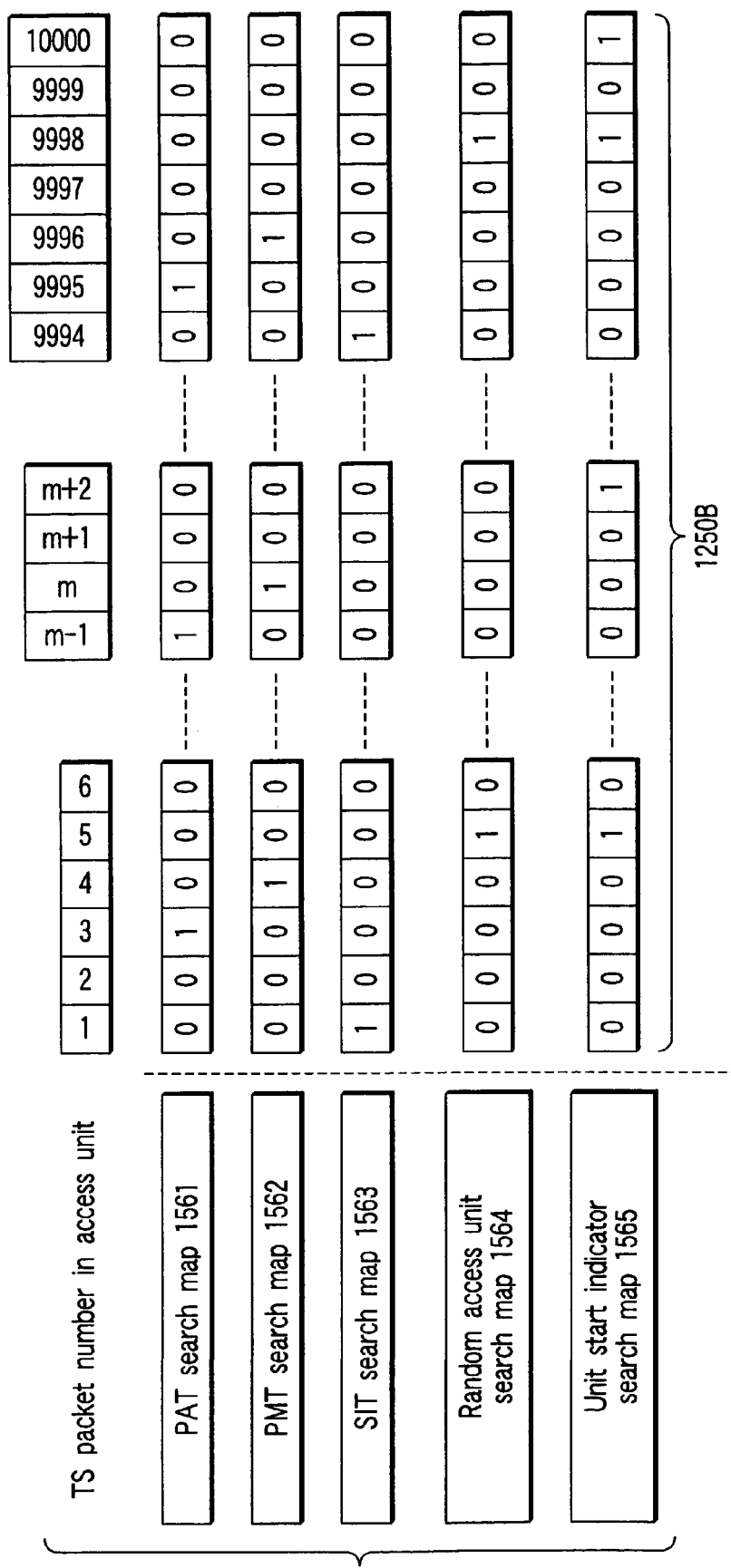
FIG. 26 is an explanatory view of one example of each search map.

FIG. 26 shows one example of each search map in the search map information 156 shown in FIG. 12. Here, the maximum number of TS packets stored in the access unit is set to 10,000, each search map is associated with the TS packet number in the bitmap table, and the size is 1250 bytes (B).

The search map information 156 can be used to easily search for each present TS packet for each purpose such as PAT, PMT, SIT and I frame without successively checking the TS packets in the access unit.

Figure 27:
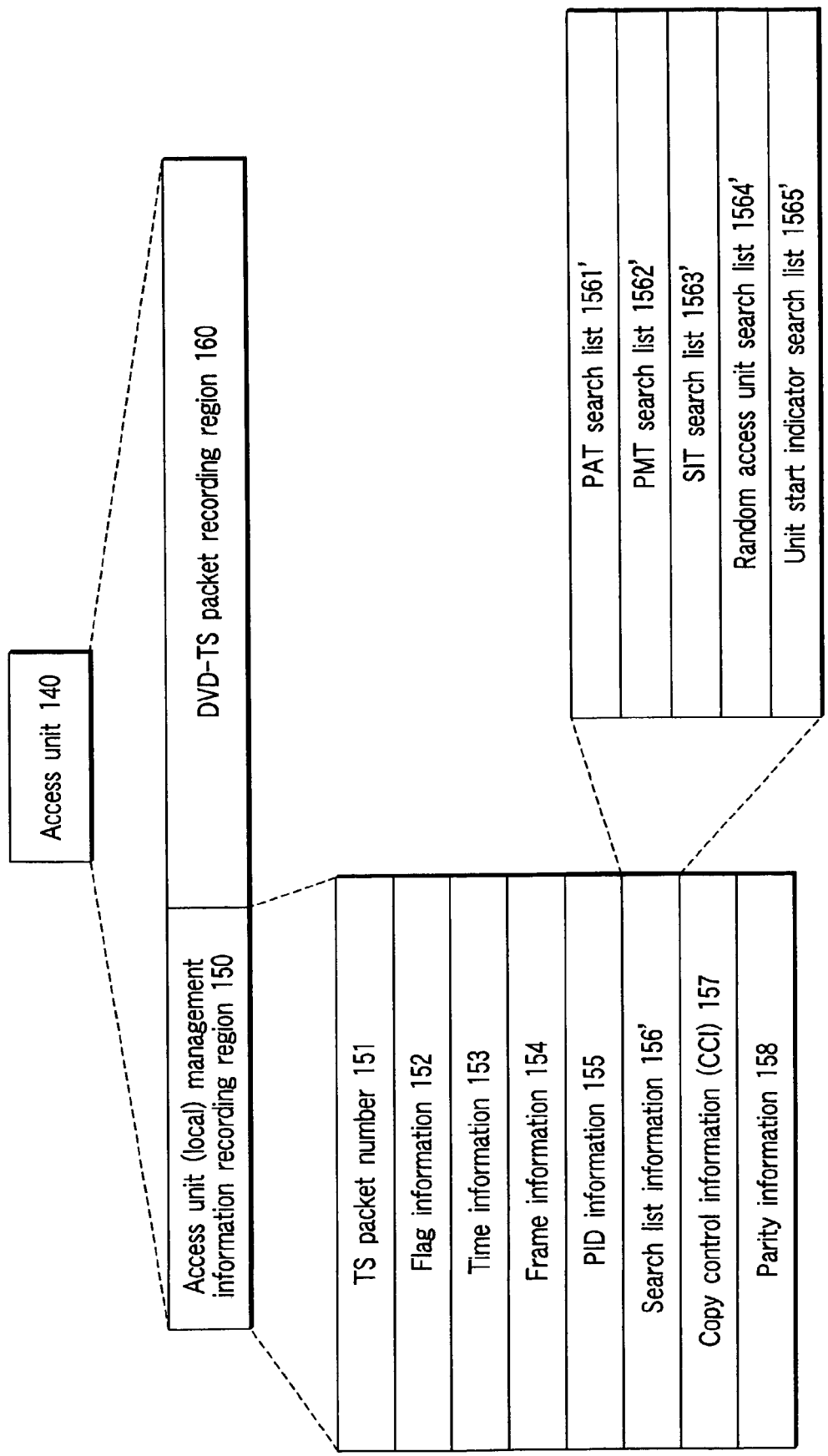
FIG. 27 is an explanatory view of another example of search list information.

FIG. 27 shows a case in which search list information 156' is used instead of the search map information 156 shown in FIG. 12. Similarly as the search map shown in FIG. 12, the search list information 156' includes a PAT search list 1561', PMT search list 1562', SIT search list 1563', random access unit search list 1564', and unit start indicator search list 1565'.

Figure 28:
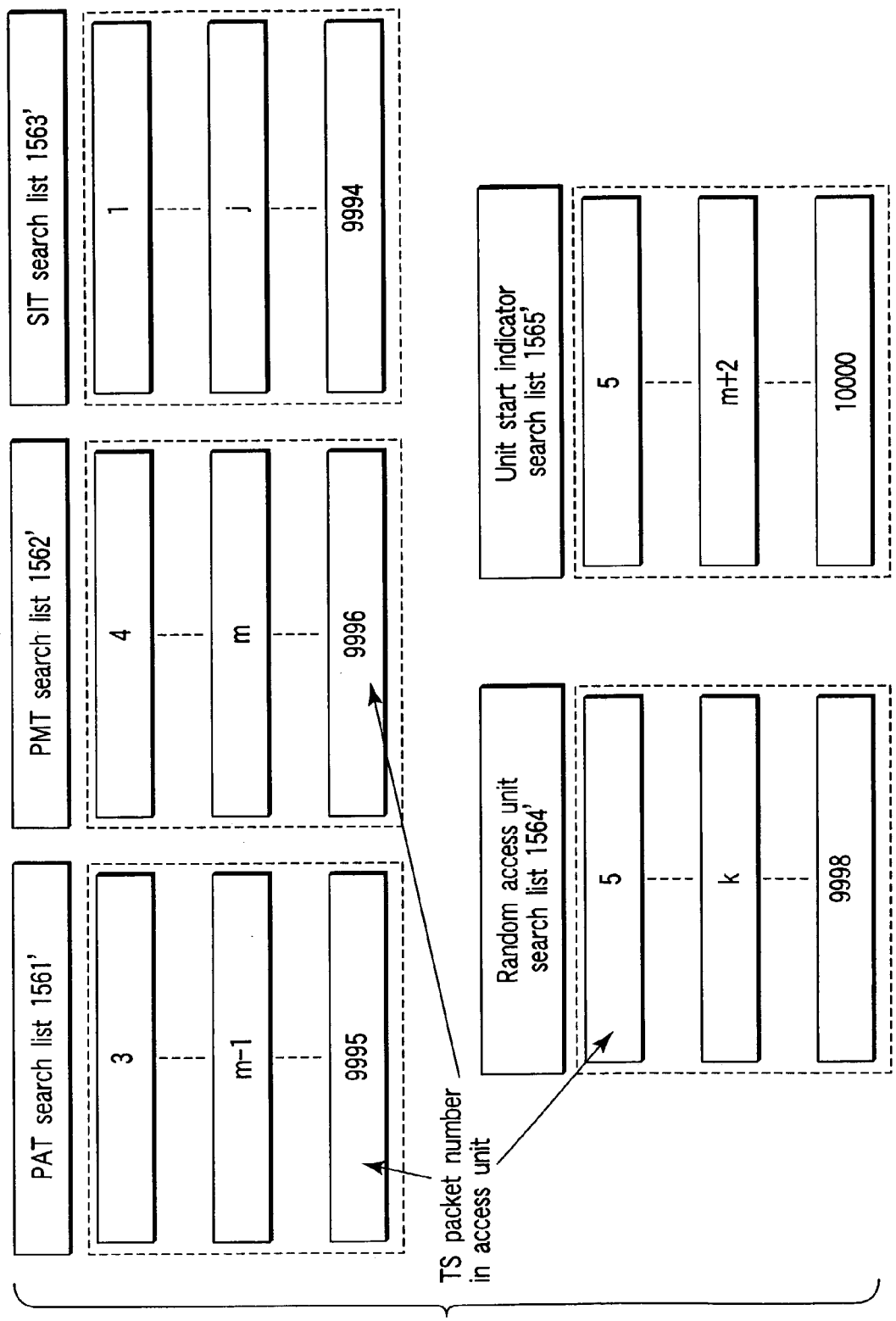
FIG. 28 is an explanatory view of details of the search list information.

FIG. 28 shows one example of each search map in the search list information 156' shown in FIG. 27. In each search list, the TS packet number present for each purpose such as PAT, PMT, SIT, and I frame is listed and stored, and this facilitates the search for the target TS packet.

FIG. 29 shows content of the MPEG-TS packet 164 shown in FIG. 1. The MPEG-TS packet 164 is defined by MPEG-TS standard, and has a fixed length of 188 bytes. The packet is constituted of a header 170 of four bytes positioned in the top, and adaptation field and/or payload 180.

In the header 170, a synchronous byte 171, transport error indicator 172, payload unit start indicator 173, transport priority 174, PID 175, transport scramble control 176, adaptation field control 177, and continuity indicator 178. In the adaptation field and/or payload 180, the image, sound, and data can be stored.

Figure 30:
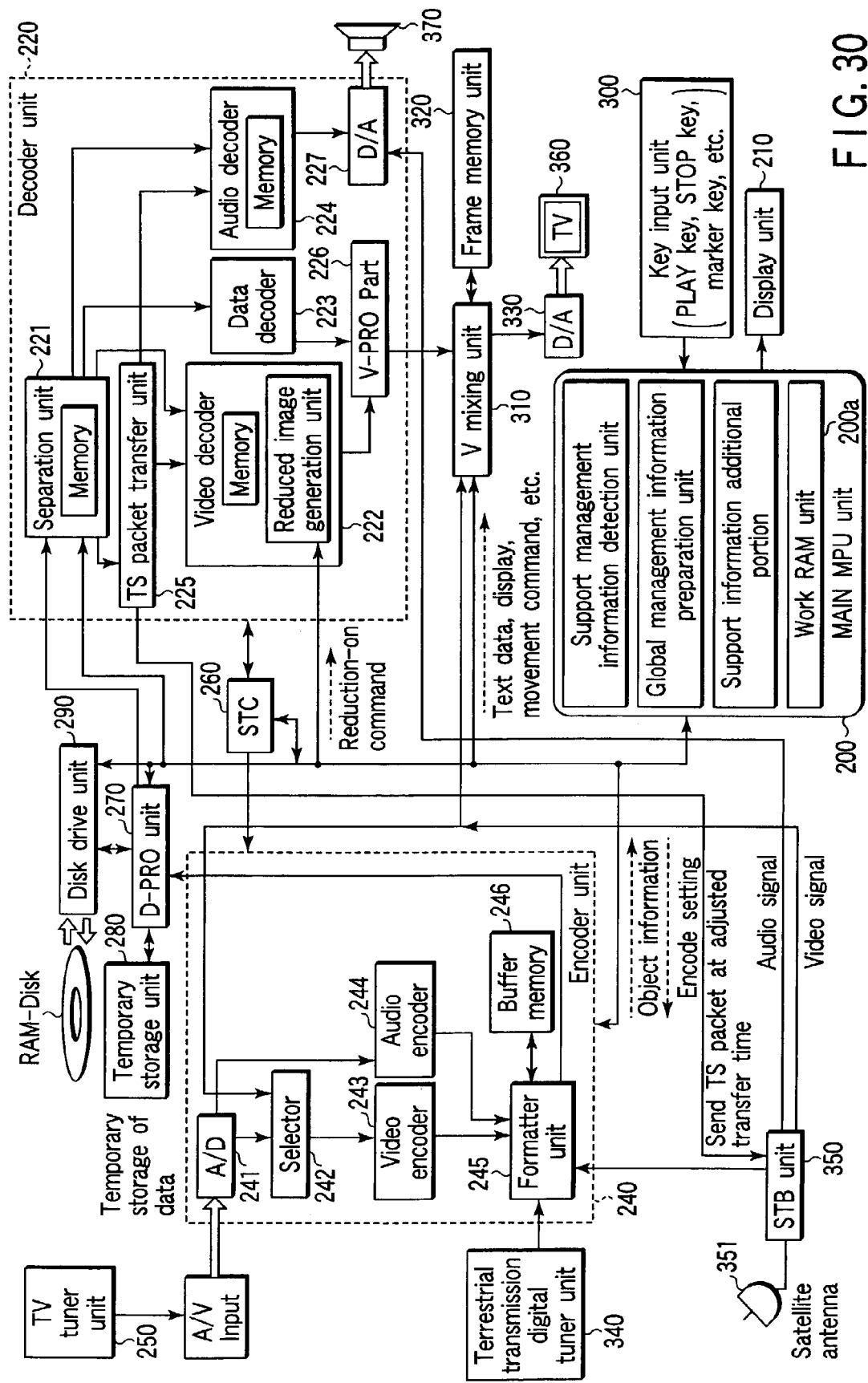
FIG. 30 is a block diagram showing one example of a information reproducing apparatus.

One example of a recording method for recording the data structure in the embodiment will next be described. As shown in FIG. 30, the recording/reproducing apparatus of the embodiment is constituted of an MPU unit 200, display unit 210, decoder unit 220, encoder unit 240, TV tuner unit 250, system time counter (STC) unit 260, D-PRO unit 270, temporary storage unit 280, disk drive unit 290, key input unit 300, V mixing unit 310, frame memory unit 320, digital/analog (D/A) unit 330 for TV, surface wave digital tuner unit 340, and STB unit 350.

The encoder unit 240 is constituted of an A/D unit 241, selector 242, video encoder 243, audio encoder 244, formatter unit 245, and buffer memory 246.

The decoder unit 220 is constituted of a separation unit 221, video decoder 222, data decoder 223, audio decoder 224, TS packet transfer unit 225, V-PRO unit 226, and audio D/A unit 227.

An antenna 351 for receiving the digital broadcasting is attached to the STB unit 350.

Figure 31:
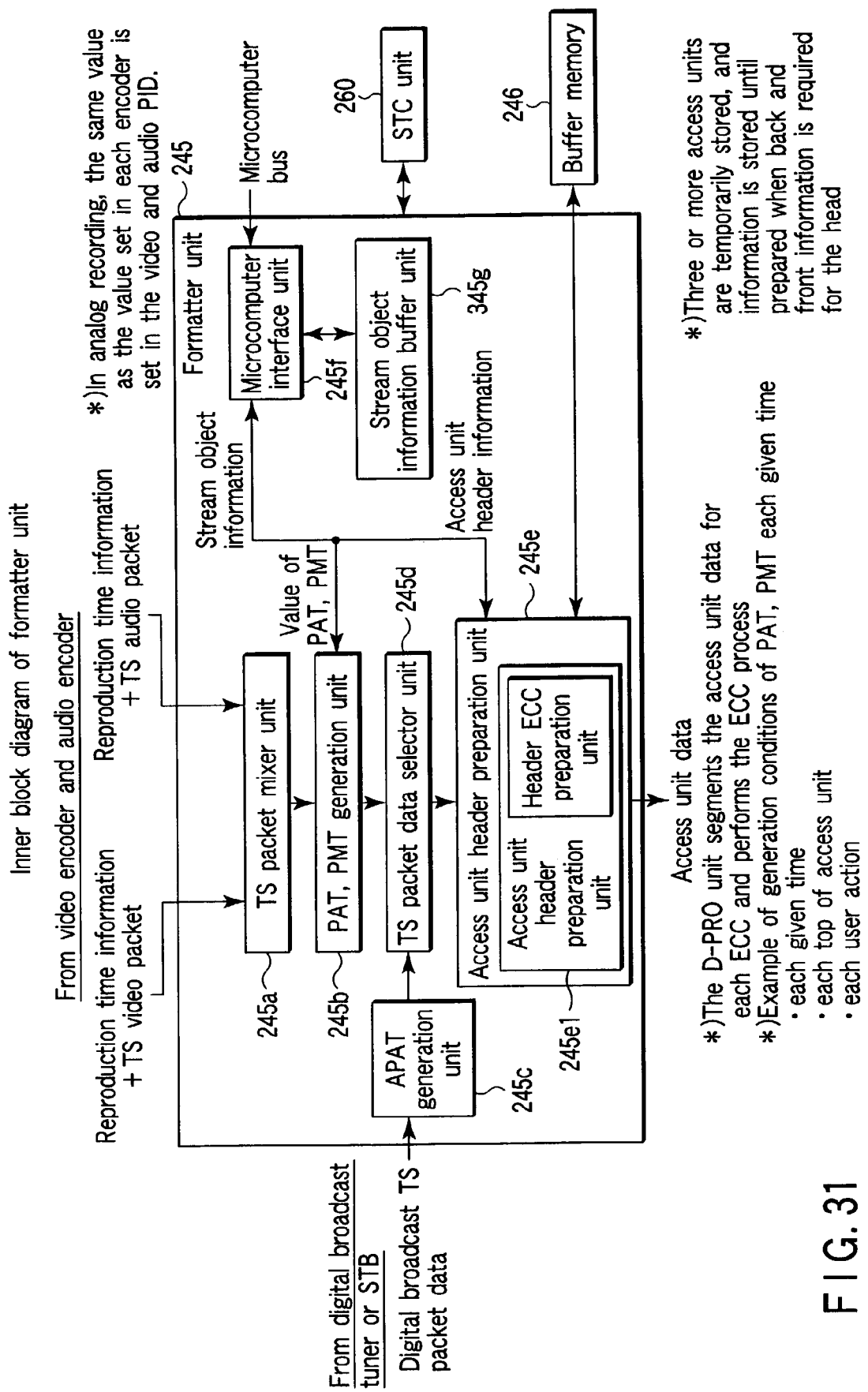
FIG. 31 is a block diagram showing details of a formatter unit.
Figure 32:
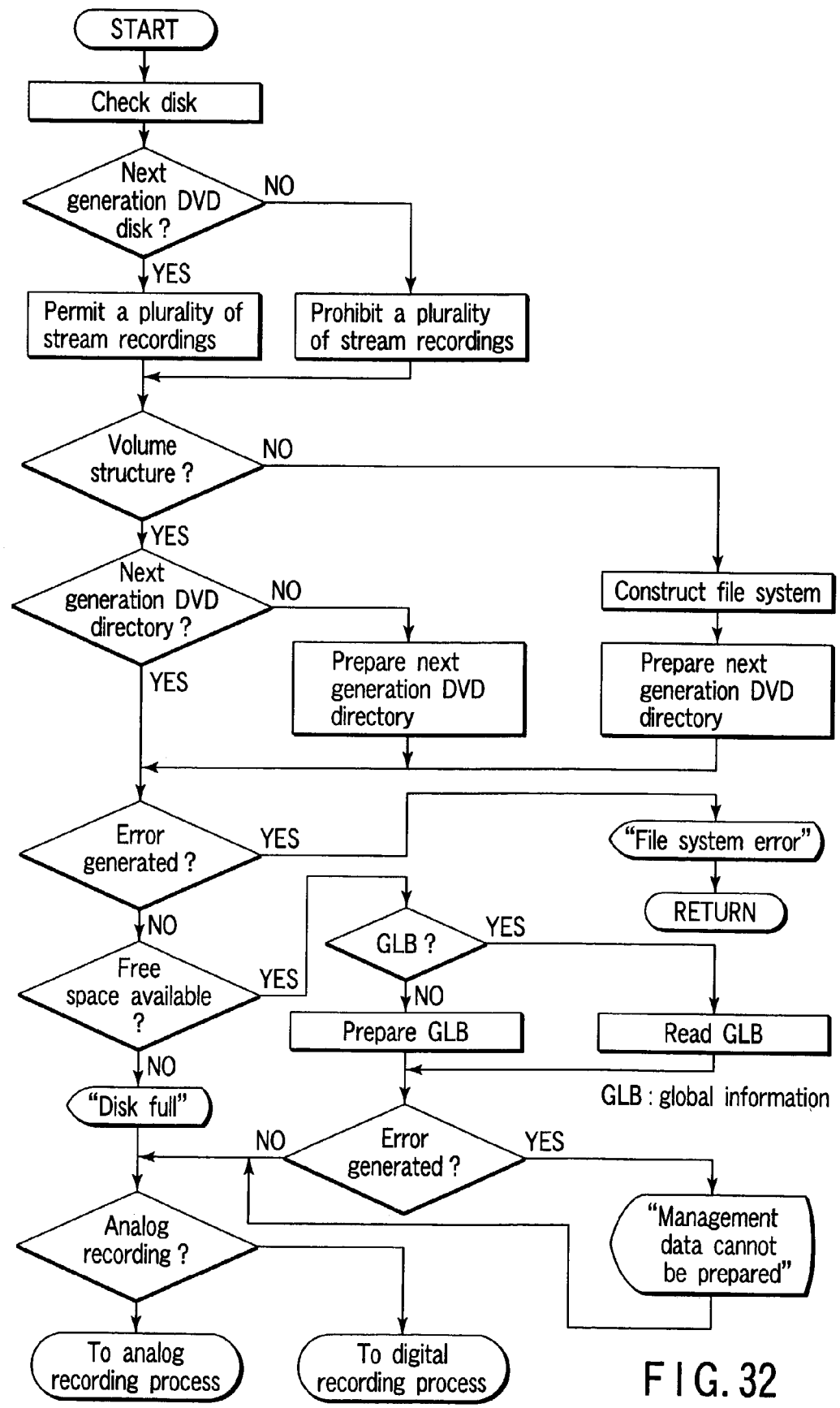
FIG. 32 is a flowchart showing a recording pre-processing operation.
Figure 33:
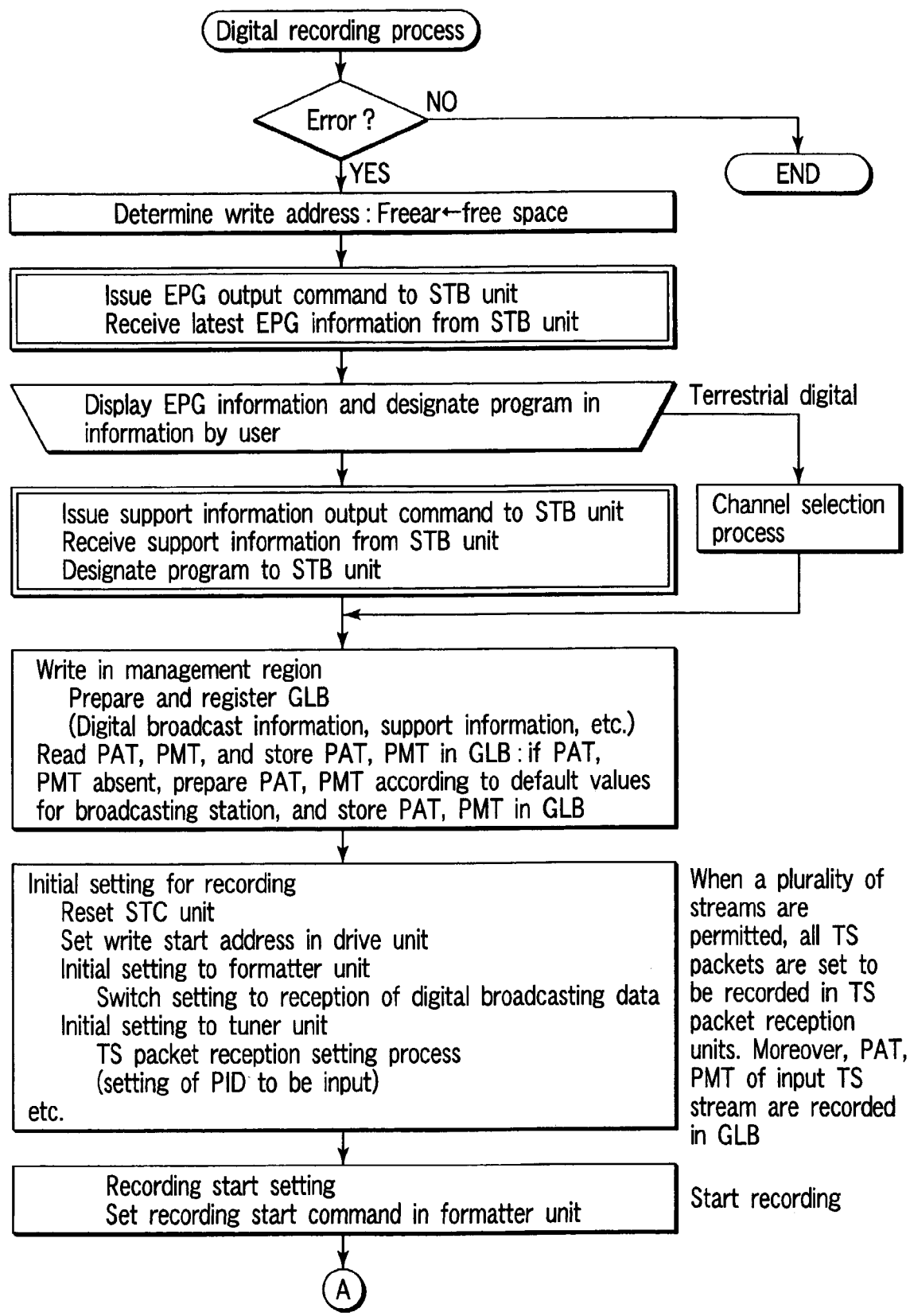
FIG. 33 is a flowchart showing a digital recording operation.
Figure 34:
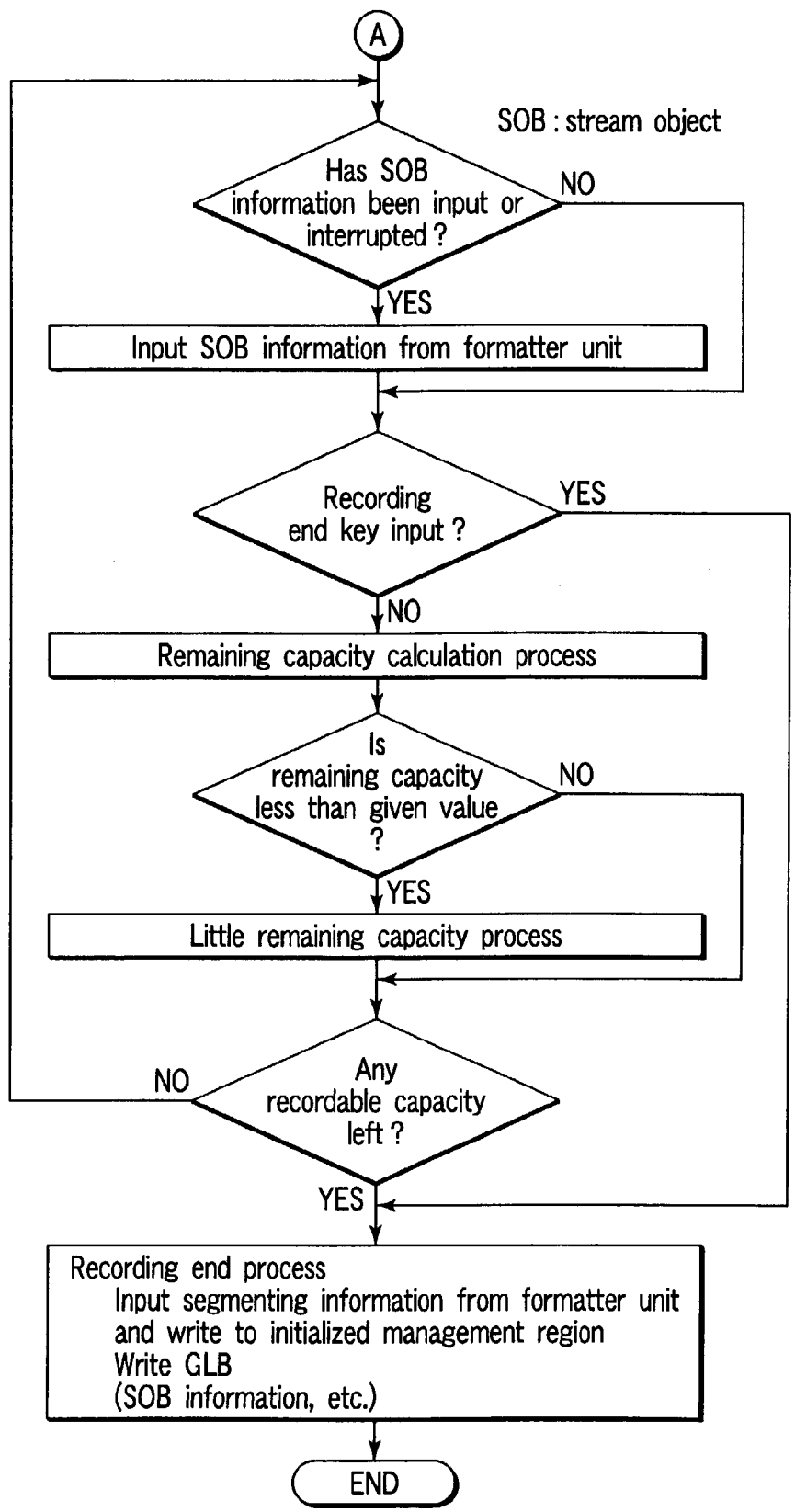
FIG. 34 is a flowchart showing the digital recording operation.
Figure 35:
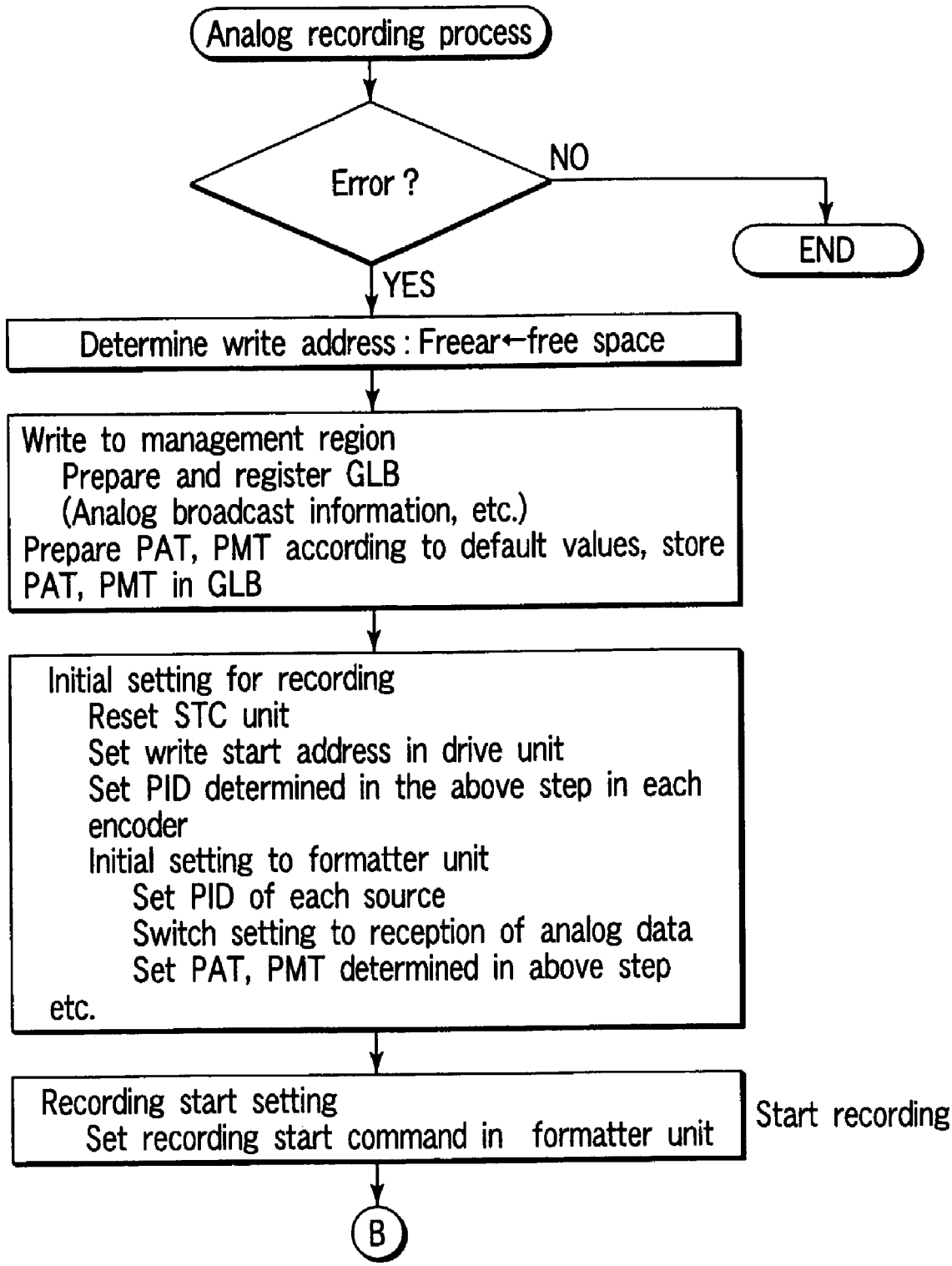
FIG. 35 is a flowchart showing an analog recording operation.
Figure 36:
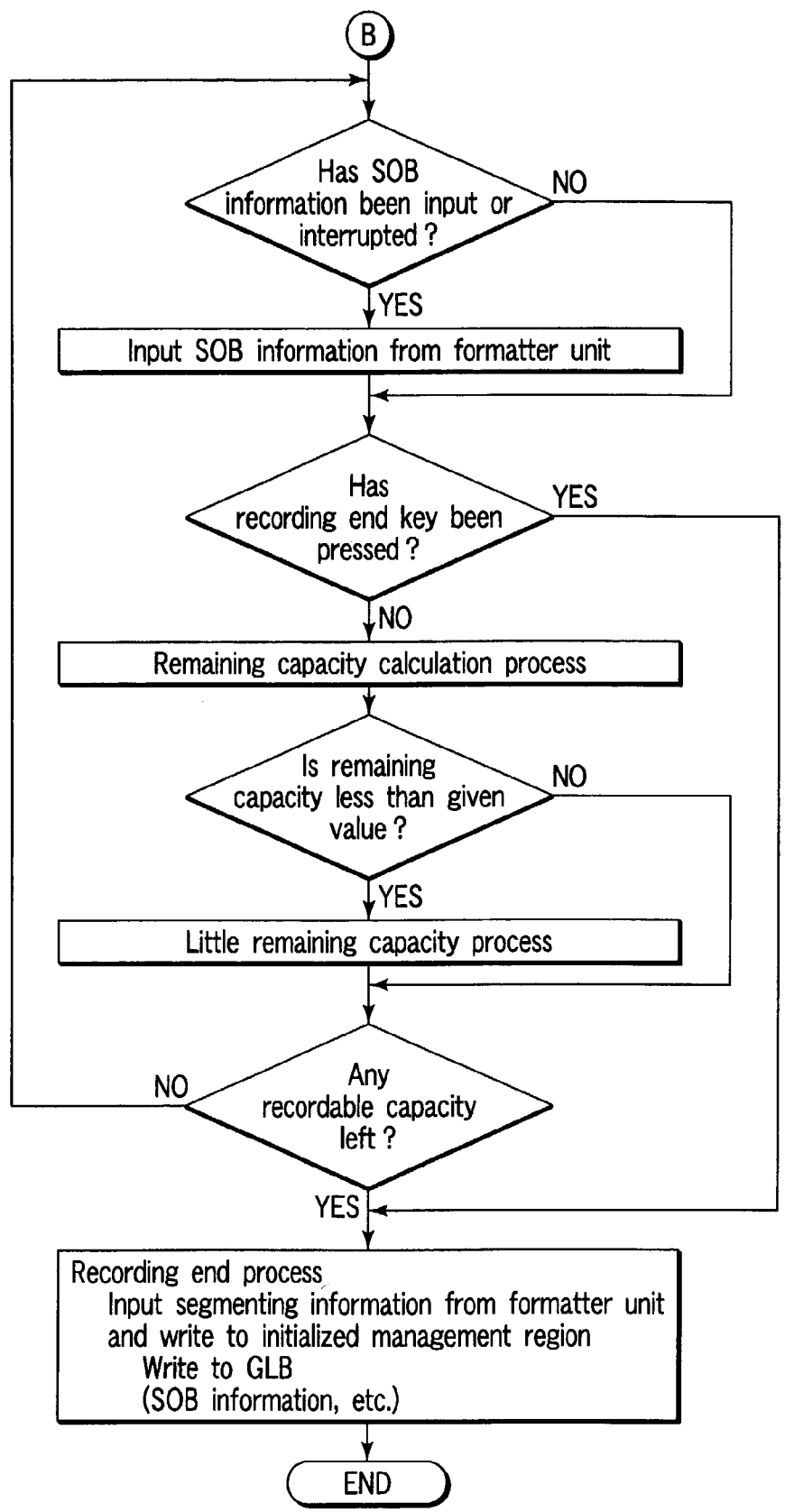
FIG. 36 is a flowchart showing the analog recording operation.

Moreover, as shown in FIG. 31, the formatter unit 245 is constituted of a TS packet mixer unit 245a, PAT, PMT generation unit 245b, APAT generation unit 245c, TS packet data selector unit 245d, access unit formation unit 245e, microcomputer interface 245f, and stream object information buffer unit 245g.

A signal flows as follows. First, an analog signal is digitized by the A/D unit 241, a video signal is encoded into TS packet by the video encoder 243, an audio signal is encoded into TS packet by the audio encoder 244, and the signals are input into the formatter unit 245.

At this time, when the time information is required before each TS packet, the time data is prepared from the reproduction time and added. The formatter unit 245 receives the TS packet data from the respective encoders 243, 244 by the packet mixer unit 254a, and mixes the video and audio TS packets. Additionally, at an encode time, a buffer model is assumed, and the time information is set into each TS packet so as to prevent underflow from occurring.

Furthermore, the PAT, PMT generation unit 245b generates PAT, PMT in accordance with the value set by the MPU unit 200, and inserts the information based on given conditions. The PAT, PMT information to be inserted is prepared as template beforehand, and held by the PAT, PMT generation unit 245b.

Assumable conditions include each given time, each top of the access unit, and each user action (recording start time, pause time, marker setting time, and the like). Furthermore, a combination of these is also possible.

The TS packet data selector unit 245d selects the data from analog input, and inputs the data into the access unit formation unit 245e.

Since the input from the digital broadcasting is formed into the TS packet beforehand, the input is input as such into the APAT generation unit 245c, APAT is added, and the data is input into the access unit formation unit 245e via the TS packet data selector unit 245d.

The access unit formation unit 245e generates the local management information to be recorded into the unit header [the same as the access unit (local) management information recording region 150] by the MPU unit 200, or internally generates the information [prepares the information referring to the flag in the TS packet header and prepares error correction information (parity, etc.) by a header ECC preparation unit 245e1 inside the access unit formation unit 245e], and forms the information corresponding to the integer of ECC into the access unit.

Here, the local management information to be recorded in the unit header in the access unit 140 includes the TS packet number 151, various types of flag information 152 such as the analog/digital input type identification flag 1521, time information 153, search map information 156, search list information 156', and the like.

Above all, when the search information is required over the access units, the information for several units is stored in the buffer memory unit 246 beforehand. At a time when the information is prepared, the unit header is completed, and input into the D-PRO unit 270 for each access unit.

At this time, the information to be registered as the global information in the stream data management information recording region 130 is stored as the time map information or stream object information in the buffer for the management information. When a given or more amount of information is stored, the information is transferred to the MPU unit 200 (notified by interrupt).

The D-PRO unit 270 adds error correction information to each ECC block, and records the information into the disk. Additionally, when the disk drive unit 290 is not prepared for recording the data into the disk, the data is temporarily transferred to the temporary storage unit 280. The unit waits until preparation for the recording of the data is made. In a stage in which the preparation is made, the recording is started. Here, a large-capacity memory is assumed as the temporary storage unit 280 such that the recording data is held for several or more minutes by high-speed access.

Additionally, to read/write the data with respect to the management region of the file, the microcomputer can read/write the data through a microcomputer bus in the D-PRO unit 270.

FIGS. 32 to 36 show operation steps at a recording time.

(1) On receiving a recording command from the key input unit 300, the MPU unit 200 reads the management data from the disk drive unit 290, and determines a region to be written. At this time, a process before the recording comprises: checking and judging whether or not the disk is a next generation DVD disk (recording at high capacity and rate is possible by the next generation DVD-RAM disk). With the next generation DVD disk, a plurality of stream recording operations are permitted. If not (with the present DVD-RAM or DVD-RW), the plurality of stream recording operations are constituted to be prohibited. Moreover, it is checked and judged whether the file system can be recorded. When the recording is possible, the position to be recorded is determined. When the recording is not possible, this is notified to the user, and the process is stopped.

(2) The determined recording position is set to the management region so that the data is written, a write start address of the video data is set to the disk drive unit 290, and a preparation for the recording of the data is executed.

(3) It is judged whether the digital broadcasting or analog signal is recorded (set by the user). To record the digital broadcasting, the process shifts to (4). To record the analog broadcasting, the process shifts to (15).

(4) The STB unit 350 outputs a command for reading out an electronic program guide (EPG). The STB unit 350 prepares the latest EPC (received EPG data or EPG data stored in a work memory in the STB unit 350), and returns the data to the MPU unit 200. For terrestrial digital broadcasting, EPG screen is prepared from the data of data broadcasting inserted in the digital broadcasting, and the data is stored in the work memory.

(5) The MPU unit 200 displays the EPG data, and allows the user to select the program to be recorded. Moreover, when the program to be recorded is determined, support information is extracted from the STB unit 350. At this time, when the support information is not in the STB unit 350, the corresponding information is checked and used instead during the recording. Moreover, for the terrestrial signal, the support information is constituted based on the predetermined support information in accordance with a broadcasting station of the broadcasted program.

(6) Time is reset in the STC unit 260. Here, the STC unit 260 records, reproduces the data based on a timer value with a timer of the system.

(7) The program to be recorded is designated, and the STB unit 350 or terrestrial digital tuner unit 340 to start receiving the program. Moreover, for the surface wave, after usually selecting a channel, the unit reads PAT, determines PID to extract PMT of the target program, reads in the target PMT, and determines PID of each data (video, audio) to be decoded (recorded). At this time, PAT, PMT are stored in a work RAM unit 200a of the MPU unit 200 and written into the management information. Here, for a system without any PAT or PMT, since PID is determined beforehand, PMT is prepared in accordance with PID, and written into the management information.

(8) The global information is written in the stream data management information recording region 130.

(9) Recording setting is performed with respect to each unit. At this time, switch to digital broadcasting data reception is set to the formatter unit 245, PID of the data to be recorded is set to the STB unit 350 or terrestrial digital tuner unit 340 and only a target video stream is recorded.

(10) The stream data to be recorded is received from the STB unit 350 or terrestrial digital tuner unit 340, taken into the encoder unit 240, and formed into the access unit.

(11) During the recording, the stream object information is periodically stored in the work RAM 200a of the MPU unit 200. Here, the stream object information includes a presence/absence flag of PAT/PMT/I frame, flag indicating the change of PAT, access unit start/end time, and the like.

(12) A residual capacity is checked. When the capacity is reduced by a given or more amount, a low residual capacity process is performed to give a warning of low residual capacity to the user.

(13) It is checked whether or not the recording ends (whether a recording end key is operated or whether the residual capacity runs out). At an end time, the residual stream object information is extracted from the formatter unit 245, and added to the work RAM 200a, and the data is recorded in the stream data management information recording region 130.

(14) When the recording does not end, the process shifts to (11), and the data is continuously taken in and reproduced. When the recording ends, the process is ended.

(15) The global information is written in the stream data management information recording region 130. At this time, the information is prepared by default values of PAT and PMT, and set to the encoder unit 240.

(16) The recording setting is given to each unit. At this time, the switch to reception of the analog signal is set to the formatter unit 245, and the PID of each data is set to the encoder unit 240. Time is reset in the STC unit 260. Here, the STC unit 260 records or reproduces the signal based on the timer value with the timer of the system.

(17) During the recording, the stream object information is periodically stored in the work RAM 200a of the MPU unit 200. Here, the stream object information includes the presence/absence flag of PAT/PMT/I frame, flag indicating the change of PAT, access unit start/end time, and the like.

(18) The residual capacity is checked. When the capacity is reduced by the given or more amount, the low residual capacity process is performed to give a warning of low residual capacity to the user.

(19) It is checked whether or not the recording ends (whether the recording end key is operated or whether the residual capacity runs out). At the end time, the residual stream object information is extracted from the formatter unit 245, and added to the work RAM 200a, and the data is recorded in the stream data management information recording region 130.

(20) When the recording does not end, the process shifts to (17), and the data is continuously taken in and reproduced. When the recording ends, the process is ended.

As shown in FIG. 30, the data read by the disk drive unit 290 is transferred to the separation unit 221 of the decoder unit 220 via the D-PRO unit 270.

As shown in FIG. 37, the separation unit 221 is constituted of a data distinction process unit 221a, access unit buffer 221b, local management information buffer 221c, time measurement unit 221d, packet data buffer 221e, and packet data decoder 221f.

The data transferred from the D-PRO unit 270 is first subjected to an ECC processing in the data distinction process unit 221a. The ECC-processed data is identified as DVD-TS packet data or local management information.

The DVD-TS packet data is sent to the access unit buffer 221b. The local management information is subjected to an error detection/correction process based on the parity information in the local management information, and subsequently sent to the local management information buffer 221c.

That is, the local management information in the local management information buffer 221c indicates the information of data in the access unit buffer 221b, and the information is referred to by the MPU unit 200.

Moreover, in the data in the access unit buffer 221b, the time information (arrival time information of the MPEG-TS packet) is sent to the time measurement unit 221d, and the packet data (MPEG-TS packet in this embodiment) is sent to the packet data buffer 221e.

The time information has one-to-one correspondence with the packet data, and the packet data in the packet data buffer 221e is sent to the TS packet transfer unit 225 or packet data decoder 221f in accordance with the time information of the time measurement unit 221d.

The packet data sent to the TS packet transfer unit 225 is transferred to external STB via a digital interface of IEEE1394, and the packet data sent to the packet data decoder 221f is transferred to the video, audio, and data decoders 222, 224, 223.

The respective decoders 222, 224, 223 decode the sent packet data. The video data is D/A converted via the V-PRO unit 226, and then displayed in the TV 360. The audio data is D/A converted, and then reproduced by the speaker 370.

Figure 38:
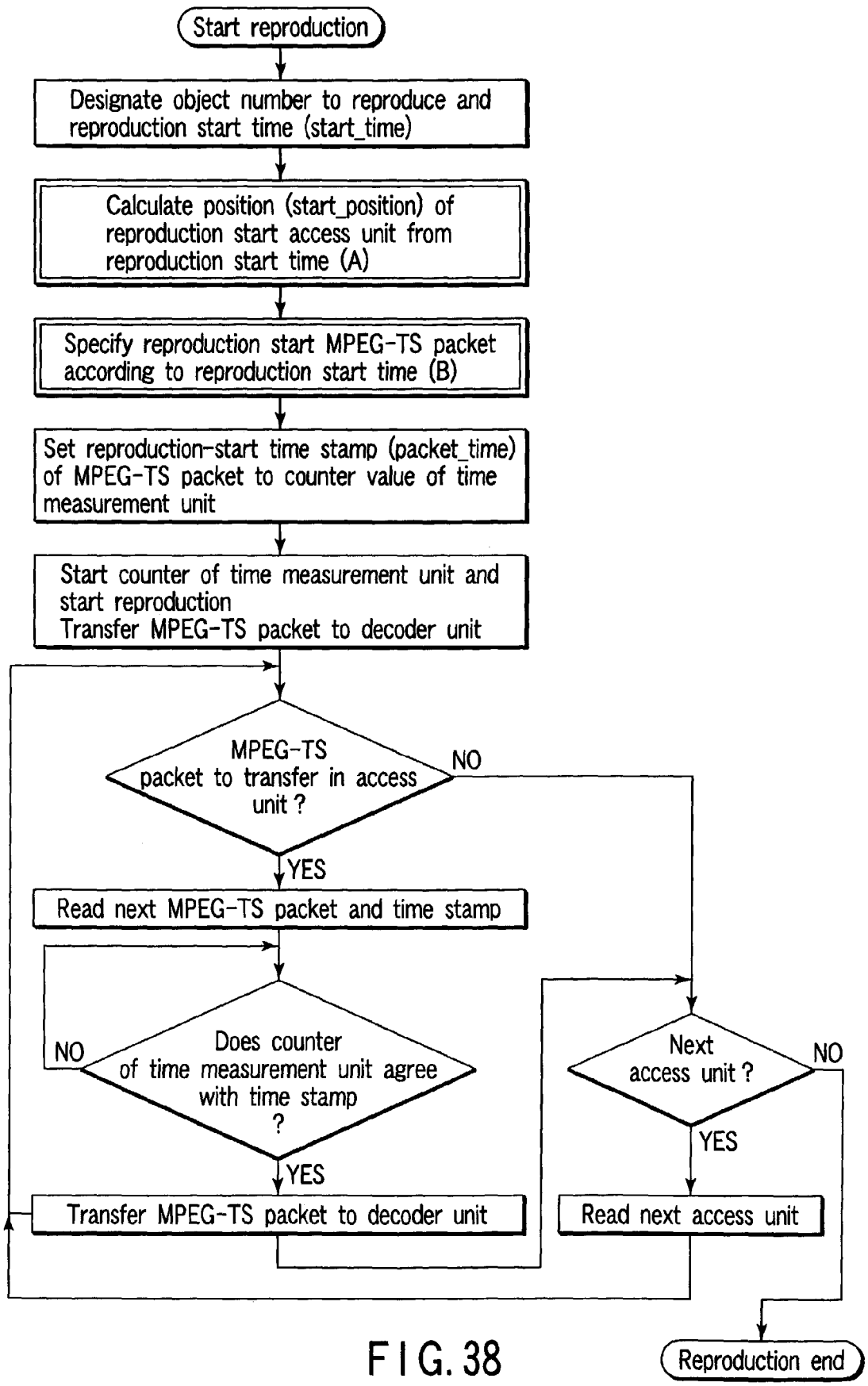
FIG. 38 is a flowchart showing a usual reproduction operation.

A reproduction operation will be described hereinafter. FIGS. 38, 39A, 39B show a usual reproduction operation. First the MPU unit 200 of the recording/reproducing apparatus designates an object to be reproduced, and time start_time to start the reproduction.

The global management information of the disk is stored beforehand in the work RAM 200a of the MPU unit 200. In the global management information, the time map information of the designated object exists. This time map information can be used to convert the designated time to logical address start_place.

In the time map information, time difference diff_time among a given number m of access units is recorded. When the difference is added, the access unit corresponding to the time to start the reproduction can be specified. That is, the time differences of the access units are added up, until the following is satisfied.

$$\sum_{k=1}^{n} \text{diff\_time}(k) \le \text{start\_time} < \sum_{K=1}^{n+1} \text{diff\_time}(k)$$

After specifying n, the position of the access unit for starting the reproduction is specified by the following:

start_position=n×m×au_size, wherein au_size denotes the size of one access unit.

After specifying the position of the access unit, the access unit which starts the reproduction is read. The packet data and time information are sent to the packet data buffer 221e and time measurement unit 221d via the access unit buffer 221b.

The local management information is sent to the local management information buffer 221c. Moreover, the time information is searched for from the time measurement unit 221d, and the MPEG-TS packet which has the time information equal to start_time is a MPEG-TS packet of reproduction start.

The recording/reproducing apparatus transfers the packet to the decoder unit 220 in order from the MPEG-TS packet which starts the reproduction. The packet is transferred based on the time information recorded together with the packet.

First, the time measurement unit 221d in the recording/reproducing apparatus is set to the value of the time information which the MPEG-TS packet for starting the reproduction has, and the time measurement unit 221d operates a counter from the set value.

Additionally, the MPEG-TS packet to start the reproduction is transferred. The next transfer of the MPEG-TS packet is performed, when the value of the time information possessed by the next MPEG-TS packet becomes equal to the value of the counter of the time measurement unit 221d.

Moreover, when the reproduction is started, the access unit is successively read from the disk drive unit 290. Here, in the local management information buffer 221c, the local management information of the DVD-TS packet data stored in the access unit buffer 221b is stored. When the next access unit is read, the content of the local management information buffer 221c is temporarily cleared, and the next local management information is stored.

The packet data decoder 221f of the recording/reproducing apparatus first reads the program association table (PAT) of the transferred MPEG-TS packet in which PID (packet ID)=0, and acquires PID of the program map table (PMT).

Subsequently, the decoder unit 220 uses PID acquired from PAT to read PMT. In the PMT, a plurality of PIDs of the video, audio, and data packets are written. As shown in FIG. 40, based on the program (program number) designated beforehand by the MPU unit 200 of the recording/reproducing apparatus, the PIDs of the video, audio, and data packets associated with the designated program are acquired.

The packet data decoder 221f reads only the MPEG-TS packet which has the acquired PID, the video packet is transferred to the video decoder 222, the audio packet is transferred to the audio decoder 224, and the data packet is transferred to the data decoder 223.

The video decoder 222 extracts the video data from the MPEG-TS packet, and decodes the data. The decoded data is output via the V-PRO unit 226.

The audio decoder 224 extracts the audio data from the MPEG-TS packet, and decodes the data. The decoded data is output via the audio D/A unit 227.

The data decoder 223 extracts the data of data broadcasting from the MPEG-TS packet, and decodes the data. The decoded data is output via the V-PRO unit 226. At this time, the video data output from the video decoder 222 can also be output.

Figure 41:
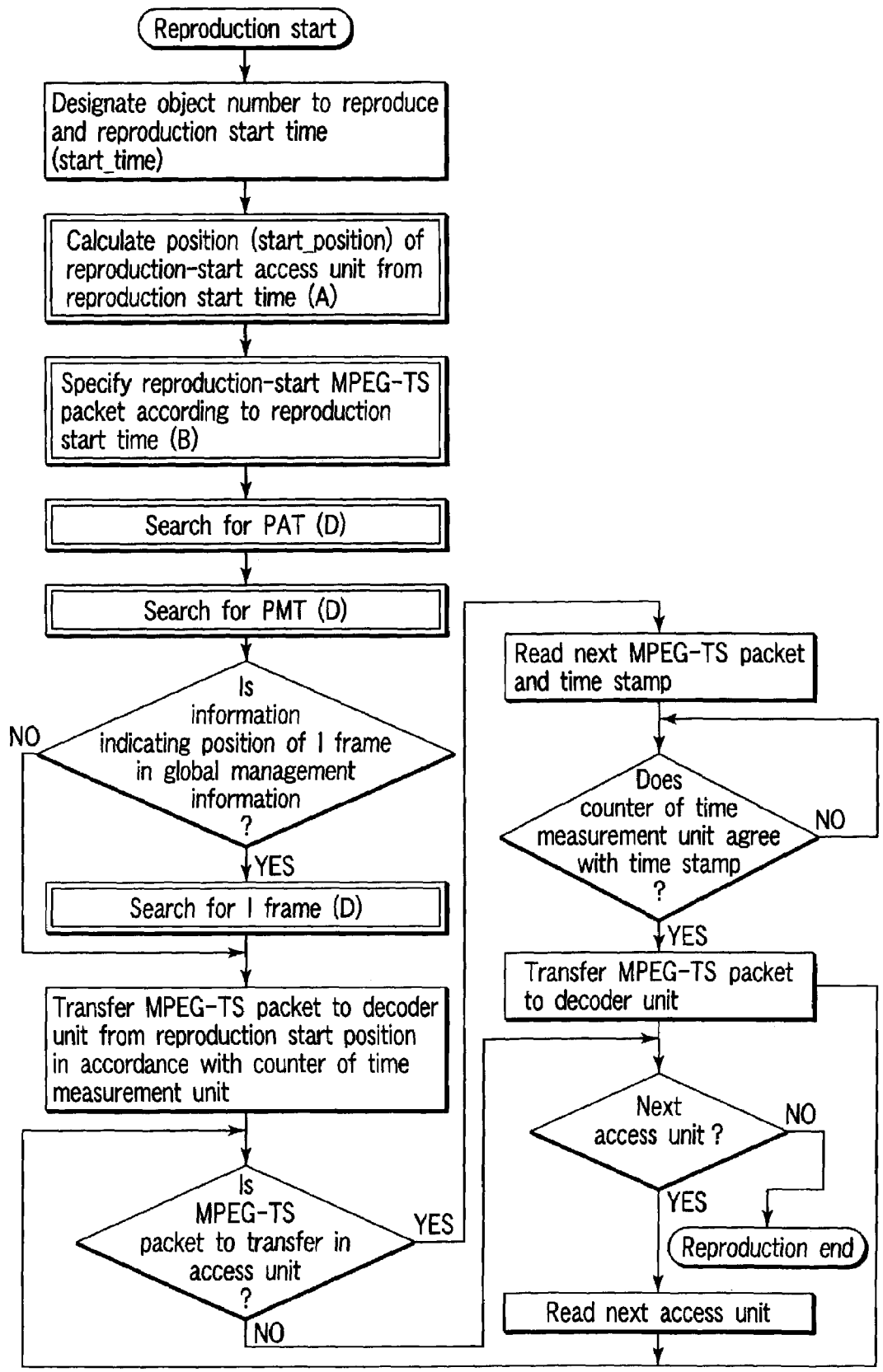
FIG. 41 is a flowchart showing a high-speed reproduction operation.
Figure 42:
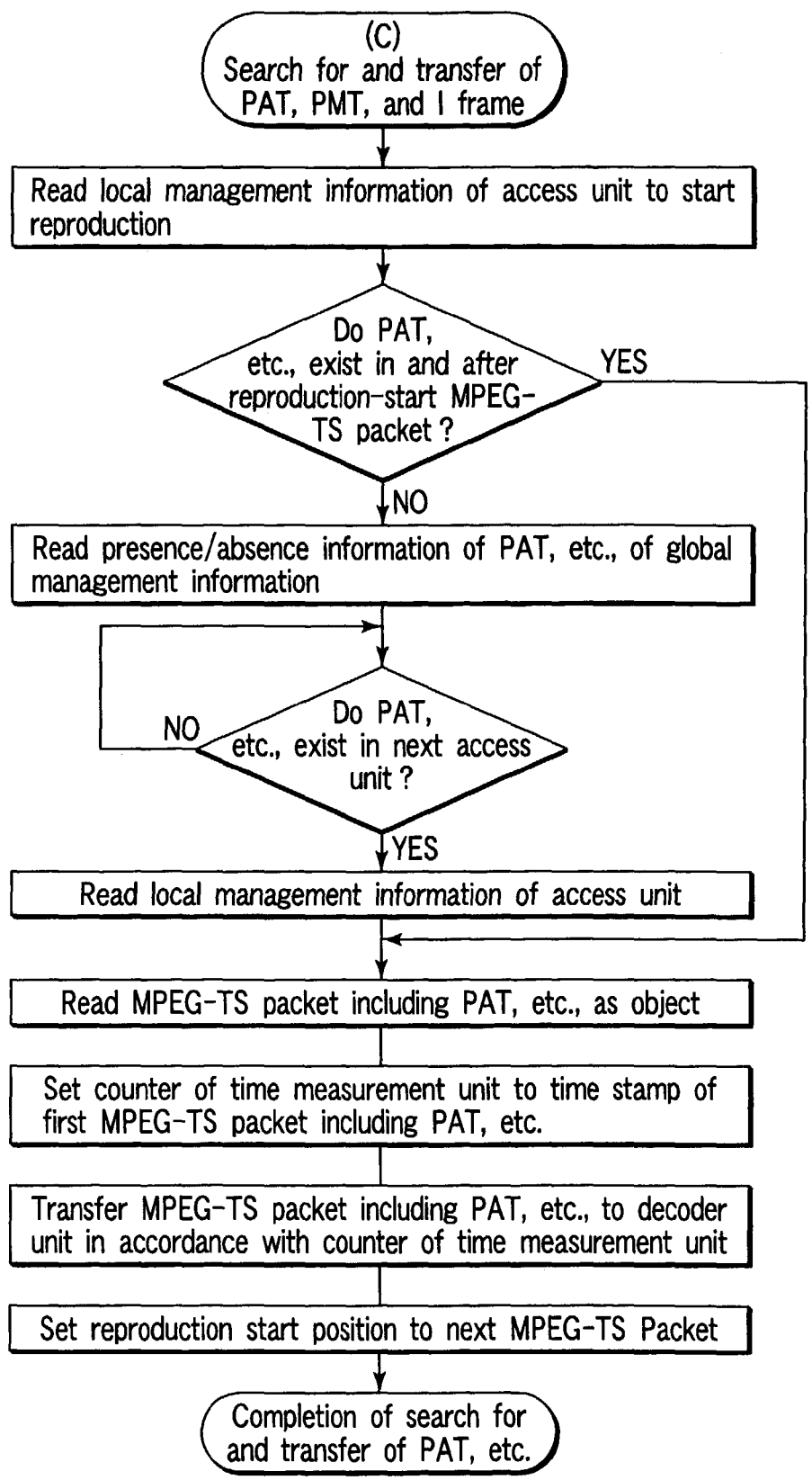
FIG. 42 is a flowchart showing details of a high-speed reproduction operation.
Figure 43:
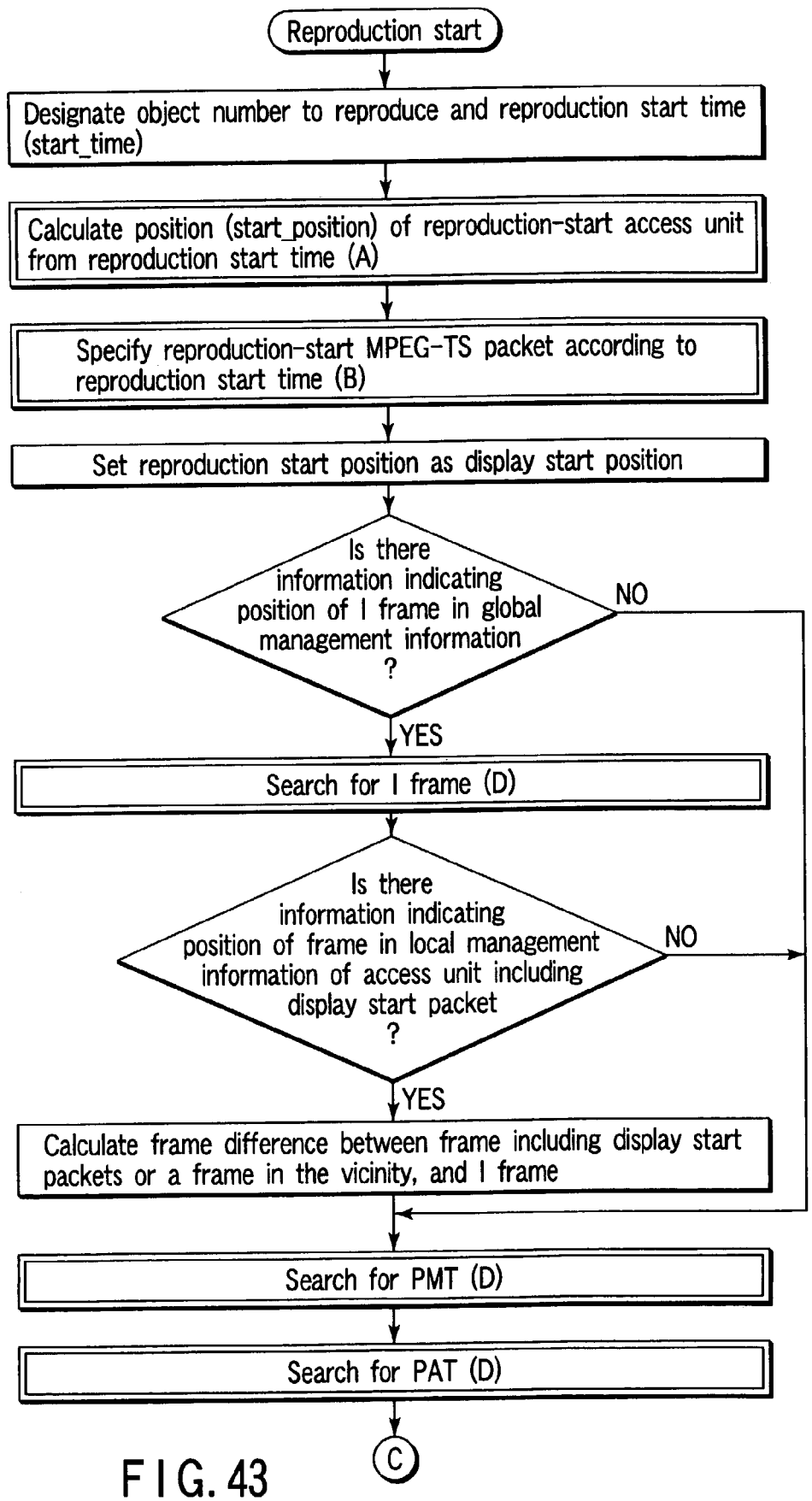
FIG. 43 is a flowchart showing an operation of correct reproduction from a designated place.
Figure 44:
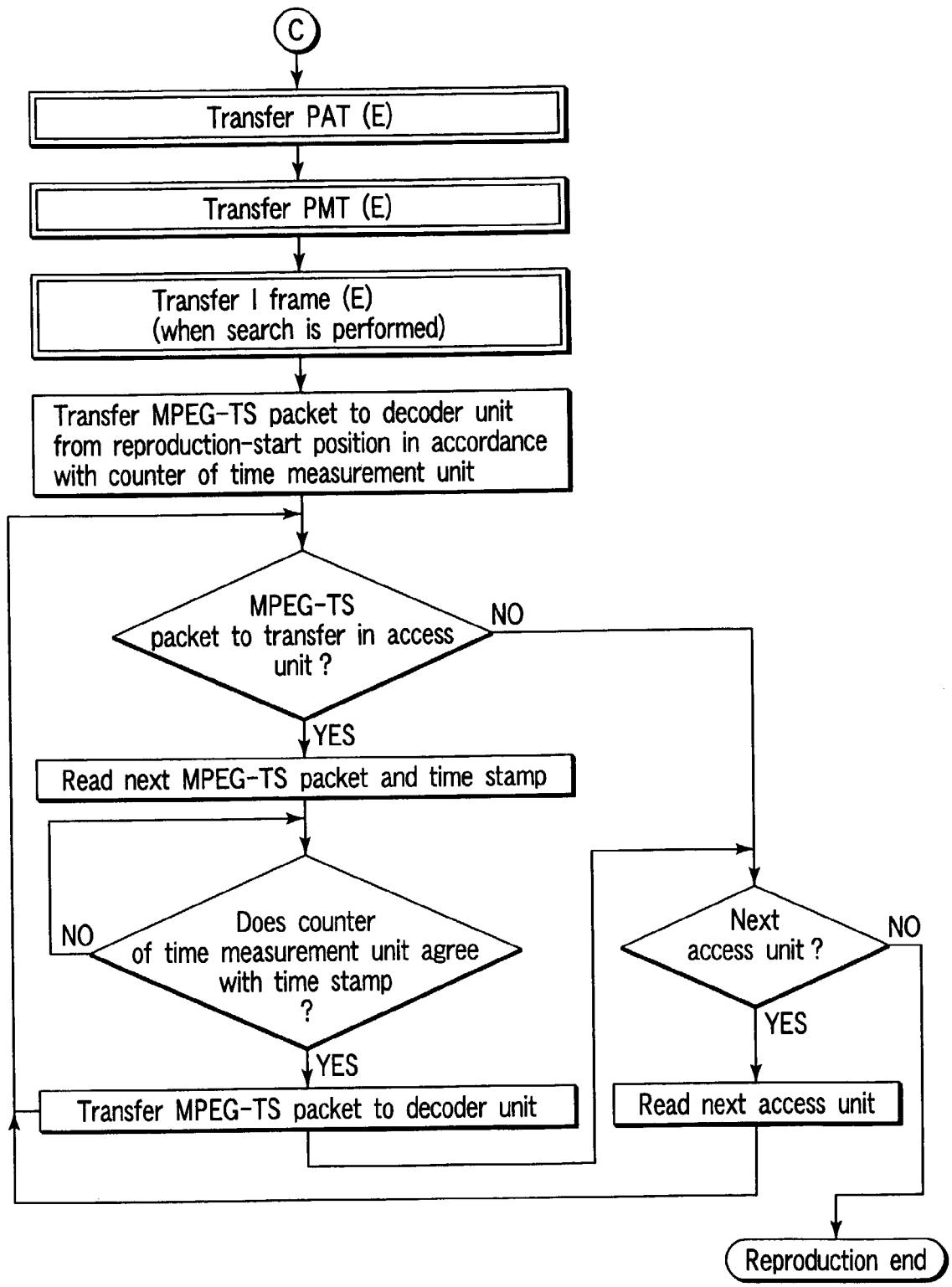
FIG. 44 is a flowchart showing an operation of correct reproduction from the designated place.
Figures 45A, 45B:
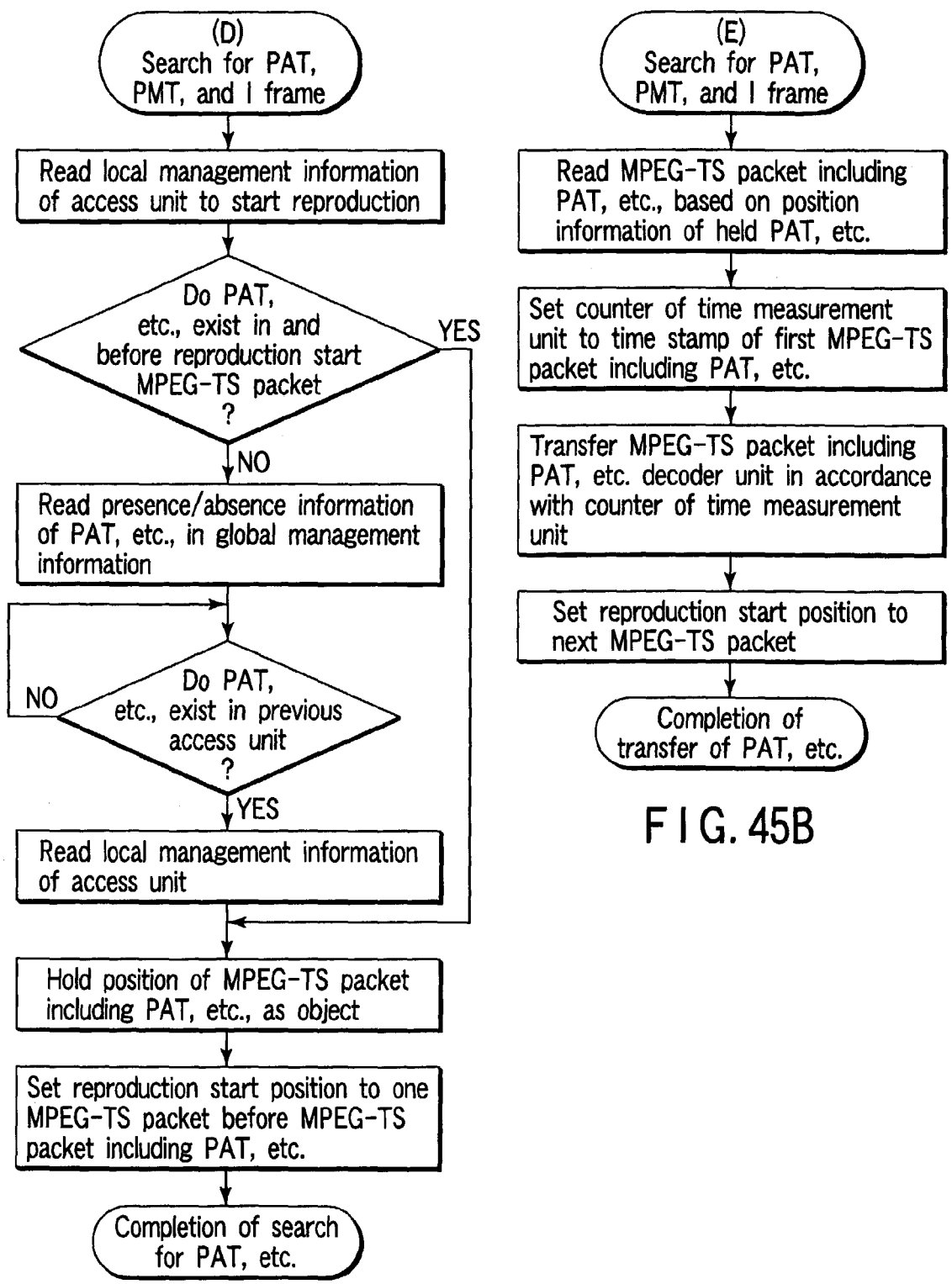
FIGS. 45A and 45B are flowcharts showing details of the operation of correct reproduction from the designated place.

Next, FIGS. 41 and 42 show an operation example of high-speed reproduction. In the above-described operation example at the usual reproduction time, when the MPEG-TS packet to start the reproduction is PAT or PMT, or when the video is not the I frame, the decoding cannot quickly be started. The time difference is generated until the image or sound is output. Then, an example in which the PAT, PMT, and I frame are preferentially searched for and reproduced will be described.

The recording/reproducing apparatus checks whether or not the PAT is included in the access unit to start the reproduction from the global management information stored in the work RAM 200a of the MPU unit 200. When the PAT is not included, the next access unit is checked. The global management information is searched for until the included access unit is found. For the PAT, the PAT of and after the MPEG-TS packet to start the reproduction is appropriate.

Similarly, the access unit including PMT is searched for. For the PMT, the PMT of and after the above-described found PAT is appropriate. If the information indicating whether the I frame is included also exists in the global management information, similarly the access unit including the I frame is also searched for. Also at this time, the I frame of and after the above-described found PMT is appropriate.

Subsequently, the access unit including the PAT is read out, the MPEG-TS packet including the PAT is searched for based on the local management information in the access unit, and the MPEG-TS packet including the PAT is transferred to the decoder unit 220.

Furthermore, the access unit including the PMT is read out, the MPEG-TS packet including the PMT is searched for based on the local management information in the access unit, and the MPEG-TS packet including the PMT is transferred to the decoder unit 220. At this time, when the information of the access unit including the I frame does not exist, the MPEG-TS packet following the PMT is transferred to the decoder unit 220 in order.

When the access unit including the I frame is found, the access unit including the I frame is read, the MPEG-TS packet including the I frame is searched for based on the local management information in the access unit, and the MPEG-TS packet including the I frame is transferred to the decoder unit 220 in order.

Since the PAT, PMT, and I frame are continuously transferred in the above-described procedure, it is possible to output the image and sound simultaneously with the reproduction start.

Moreover, in the above-described method, the image or sound output is started earlier. On the other hand, the MPEG-TS packets of and before the PAT, PMT, and I frame are omitted. Then, FIGS. 43, 44, 45A, 45B show an operation example in which the PAT, PMT, and I frame are transferred before transferring the MPEG-TS packet to start the reproduction, and the output is correctly issued from the designated place.

As described above, the recording/reproducing apparatus searches for the access unit including PAT, PMT, and I frame from the global management information stored in the work RAM 200a of the MPU unit 200.

First, it is checked whether or not the I frame is included in the access unit to start the reproduction. If the frame is not included, the previous access unit is checked. The global management information is searched for, until the access unit including the frame is found.

For the I frame, the I frames of and before the MPEG-TS packet to start the reproduction are appropriate. Additionally, this process is not performed, when the information of the I frame is not recorded in the global management information.

Similarly, the access unit including the PMT is searched for. For the PMT, the PMTs of and before the above-described found I frame are appropriate. Furthermore, the access unit including the PAT is also searched for. Even at this time, the PATs of and before the above-described found PMT are appropriate.

Additionally, when the PAT or PMT does not exist in and before the access unit to start the reproduction, the closest PAT or PMT of and after the access unit to start the reproduction is used instead.

Subsequently, the access unit including the PAT is read, the MPEG-TS packet including the PAT is searched for based on the local management information in the access unit, and the MPEG-TS packet including the PAT is transferred to the decoder unit 220.

Furthermore, the access unit including the PMT is read, the MPEG-TS packet including the PMT is searched for based on the local management information in the access unit, and the MPEG-TS packet including the PMT is transferred to the decoder unit 220. When the information of the access unit including the I frame does not exist, the MPEG-TS packet following the PMT is transferred to the decoder unit 220 in order.

When the access unit including the I frame is found, the access unit including the I frame is read, the MPEG-TS packet including the I frame is searched for based on the local management information in the access unit, and the MPEG-TS packet including the I frame is transferred to the decoder unit 220.

Furthermore, the MPEG-TS packet following the I frame is transferred to the decoder unit 220 in order. At this time, when the information of I, P, B frames exists, a frame difference between the frame including the MPEG-TS packet to start the reproduction and the I frame is counted from the local management information. When the MPEG-TS packet to start the reproduction is not the video packet, the video packet in the vicinity is an object.

The MPU unit 200 transmits the information to the packet data decoder 221f, decodes the I frame, does not output the image or sound for this frame, and outputs the image or sound from the frame as the object, so that a correct output of the frame unit is possible.

Figure 46:
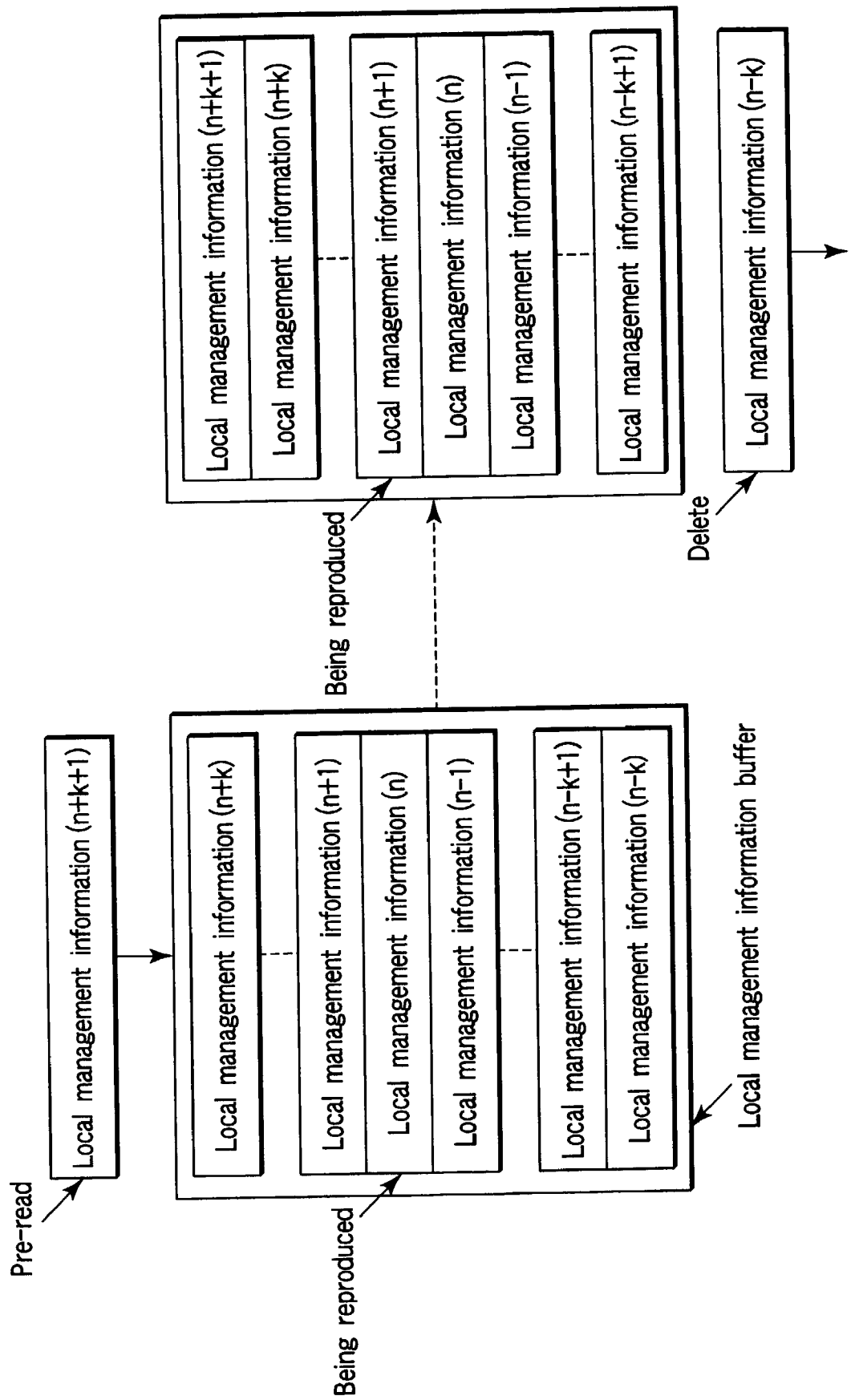
FIG. 46 is an explanatory view of a local management information buffer.

Moreover, to perform the reproduction, as shown in FIG. 46, a plurality of local management information buffers for storing a plurality of pieces of local management information are secured. The local management information of the access unit is successively stored in the local management information buffer. When the buffer is full, the local management information of the oldest access unit is deleted from the buffer, and new local management information of the access unit is stored.

Thereby, to perform special reproduction such as rewinding, it becomes easy to search the PAT, PMT, and I frame, and it is possible to quickly perform the special reproduction operation. Moreover, when the access unit is read, the local management information of the foregoing access unit is read beforehand and stored in the buffer. Therefore, it is possible to fast perform the special reproduction operation such as fast-forward.

What is claimed is:

1. An information recording medium comprising a stream data recording region, the medium being configured to record a stream object in the stream data recording region, the stream object comprising stream information including images or sound, wherein the stream data recording region includes a stream data management information recording region and a stream object group recording region, stream object management information for managing the stream object and program chain information indicating an order in which the stream object is reproduced are recorded in the stream data management information recording region, the stream object management information includes information indicating a start access unit address of the stream object and information indicating a start time and an end time of the stream object, the information indicating the start time and the end time of the stream object being expressed by one of a reproduction time of the stream object and a packet arrival time of the stream object, the program chain information includes cells indicating an order in which the stream object is reproduced, the stream object is recorded in the stream object group recording region, the stream object comprises a plurality of units, and the plurality of units comprises a plurality of packets, and information indicating a number of packets included in the units is recorded in an access unit management information recording region of the unit.

2. An information recording apparatus for recording a stream object in an information recording medium, the stream object comprised of stream information including images or sound, the information recording apparatus comprising:

a first recording section configured to record a stream data management information-in a region different from a region in which the stream object of the information recording medium is recorded the stream data management information including stream object management information for managing the stream object and program chain information indicating an order in which the stream object is reproduced, the stream object management information including information indicating a start access unit address of the stream object and information indicating a start time and an end time of the stream object, the information indicating the start time and the end time of the stream object is expressed by one of a reproduction time of the stream object and a packet arrival time of the stream object, the program chain information including cells indicating an order in which the stream object is reproduced; and a second recording section configured to record the stream object in the information recording medium the stream object comprising a plurality of units, and the plurality of units comprises a plurality of packets, wherein information indicating a number of packets included in the units is recorded in an access unit management information recording region of the unit.

3. An information reproducing apparatus for reproducing an information recording medium which is configured to record a stream object in a stream data recording region, the stream object comprising stream information including images and sound, the information reproducing apparatus comprising:

a readout section configured to read out information from the information recording medium in which the stream object is recorded the stream data recording region includes a stream data management information recording region and a stream object group recording region, wherein stream object management information for managing the stream object and program chain information indicating an order in which the stream object is reproduced are recorded in the stream data management information recording region, the stream object management information includes information indicating a start access unit address of the stream object and information indicating a start time and an end time of the stream object, the information indicating the start time and the end time of the stream object is expressed by one of a reproduction time of the stream object and a packet arrival time of the stream object, the program chain information includes cells indicating an order in which the stream object is reproduced, the stream object is recorded in the stream object group recording region, the stream object comprises a plurality of units, and the plurality of units comprises a plurality of packets, and information indicating a number of packets included in the units is recorded in an access unit management information recording region of the unit; and a control section configured to separate the access unit management information and the stream information, the access unit management information included in the stream object from information readout at the readout section.

* * * * *